United States Patent
Luna et al.

(10) Patent No.: US 6,574,273 B1
(45) Date of Patent: Jun. 3, 2003

(54) METHOD AND APPARATUS FOR DECODING MPEG VIDEO SIGNALS WITH CONTINUOUS DATA TRANSFER

(75) Inventors: Amelia Carino Luna, San Jose, CA (US); Jason N. Wang, San Jose, CA (US); Richard L. Williams, Scotts Valley, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/481,603

(22) Filed: Jan. 12, 2000

(51) Int. Cl.$^7$ .................................................. H04N 7/12
(52) U.S. Cl. ...................................................... 375/240
(58) Field of Search ............................. 375/240, 240.12, 375/240.16, 240.18, 240.24; 348/416.1, 395.1, 402.1; 712/24, 34, 35, 36, 215; H04N 7/12

(56) References Cited

U.S. PATENT DOCUMENTS

| | | | |
|---|---|---|---|
| 5,699,460 A | 12/1997 | Kopet et al. | 382/307 |
| 5,706,290 A | 1/1998 | Shaw et al. | 370/465 |
| 5,883,640 A | 3/1999 | Hsieh et al. | 345/503 |
| 6,026,478 A * | 2/2000 | Dowling | 712/215 |
| 6,028,600 A * | 2/2000 | Rosin et al. | 345/718 |
| 6,104,751 A * | 8/2000 | Artieri | 348/701 |
| 6,128,728 A * | 10/2000 | Dowling | 710/22 |
| 6,411,651 B1 * | 6/2002 | Rose et al. | 375/240.13 |

* cited by examiner

Primary Examiner—Nhon Diep
(74) Attorney, Agent, or Firm—Mayer Fortkort & Williams, PC; Karin L. Williams, Esq.

(57) ABSTRACT

A method and apparatus for decoding an input MPEG video stream are provided that includes a core processor with a very large instruction word (VLIW) processor and a co-processor that includes a variable length decoder (VLD) for decoding the MPEG video stream. The input MPEG video stream is organized into macroblocks, wherein each macroblock includes a header for a macroblock that is not decoded, and encoded data for a macroblock whose header is previously decoded by VLD. Thereafter, VLD decodes the encoded video data of a first macroblock whose header has been decoded, and decodes the header of a second (current) macroblock. VLIW then performs motion compensation on a current macroblock based upon reference data of a previously decoded macroblock. VLIW also adds a fake slice start code and fake macroblock data at the end of each picture into the input MPEG video data stream; and utilizes the fake slice start code and fake macroblock data to skip to a next picture. The fake macroblock data indicates an error to the VLD stopping the decoding process until the core processor clears the interrupt and reinitiates decoding of a selected slice.

6 Claims, 19 Drawing Sheets

|       |      |      |      |
|-------|------|------|------|
| 0xD8  | 0x92 | 0x48 | 0x84 |
| 0xE4  | 0x90 | 0x00 | 0x00 |
| 0x00  | 0x00 | 0x01 | 0xB5 |
| 0xF0  | 0xFF | 0xFF | 0xFF |
| 0xFF  | 0xFF | 0xFF | 0xFF |
| 0xFF  | ......... |   |   |

41 → MPEG STREAM DATA
42 ← FAKE SLICE START CODE
43 → FAKE MACRO BLOCK DATA

501 — MB(i − 1) DCTs
502 — MB(i) HEADER

METHOD AND APPARATUS FOR DECODING MPEG VIDEO SIGNALS WITH CONTINUOUS DATA TRANSFER

RELATED APPLICATIONS

The present Application is related to the U.S. patent application entitled "METHOD AND APPARATUS FOR DECODING MPEG VIDEO SIGNALS", Ser. No. 09/481,337, filed on the same day as the present Application, and assigned to the Assignee of the present invention. The disclosure of the patent application "METHOD AND APPARATUS FOR DECODING MPEG VIDEO SIGNALS" is hereby incorporated by reference in its entirety.

The present Application is also related to the U.S. patent application entitled "METHOD AND APPARATUS FOR DECODING MPEG VIDEO SIGNALS USING MULTIPLE DATA TRANSFER UNITS", Ser. No. 09/481,336, filed on the same day as the present Application, and assigned to the Assignee of the present invention. The disclosure of the patent application "METHOD AND APPARATUS FOR DECODING MPEG VIDEO SIGNALS USING MULTIPLE DATA TRANSFER UNITS" is hereby incorporated by reference in its entirety.

FIELD OF THE INVENTION

The present invention relates to video decoders, and more particularly, to a method and apparatus for decoding encoded MPEG video data stream into raw video data.

BACKGROUND OF THE INVENTION

MPEG Background

Moving Pictures Experts Group ("MPEG") is a committee under the International Standards Organization ("ISO") and the International Electronics Commission ("IEC") that develops industry standards for compressing/decompressing video and audio data. Two such standards that have been ratified by MPEG are called MPEG-1 and MPEG-2. MPEG-1 is documented in ISO/IEC 11172 publication and is fully incorporated herein by reference. MPEG-2 is disclosed in ISO/IEC publication 11172 and 13818, and is also incorporated herein by reference.

MPEG-1 was developed with the intent to play back compressed video and audio data either from a CD-ROM, or transfer compressed data at a combined coded bit rate of approximately 1.5 Mbits/sec. MPEG-1 approximates the perceptual quality of a consumer videotape (VHS). However, MPEG-1 was not intended for broadcast quality. Hence, MPEG-1 syntax was enhanced to provide efficient representation of interlaced broadcast video signals. This became MPEG-2.

MPEG-1 and MPEG-2 can be applied at a wide range of bit rates and sample rates. Typically MPEG-1 processes data at a Source Input Resolution (SIF) of 352 pixels×240 pixels at 30 frames per second, at a bit rate less than 1.5 Mbits/s. MPEG-2, developed to serve the requirements of the broadcast industry, typically processes 352 pixels×240 lines at 30 frames/sec ("Low Level"), and 720 pixels/line×480 lines at 30 frames/sec ("Main Level"), at a rate of approximately 5 Mbits/sec.

MPEG standards efficiently represent video image sequences as compactly coded data. MPEG standards describe decoding (reconstruction) processes by which encoded bits of a transmitted bit stream are mapped from compressed data to the original raw video signal data suitable for video display.

MPEG Encoding

MPEG encodes video sequences such that RGB color images are converted to YUV space with two chrominance channels, U and V. A MPEG bitstream is compressed by using three types of frames: I or intra frames, P or predicted frames, and B or bi-directional frames. I frames are typically the largest frames containing enough information to qualify as entry points. Predicted frames are based on a previous frame and are highly compressed. Bi-directional frames refer both to future and previous frames, and are most highly compressed.

MPEG pictures can be simply intra-coded, with no motion compensation prediction involved, forward coded with pel prediction projected forward in time, backward coded with pel prediction backward in time, or bi-directionally coded, with reference to both forward and backward pictures. Pictures can be designated as I (formed with no prediction involved as a still image from the image data originating at the source, e.g., a video camera), P (formed with prediction from forward pictures) or B (formed with prediction both from a forward picture and/or a backward picture). An example of display sequence for MPEG frames might be shown as follows:

IBBPBBPBBPBBPBBIBBPBBPB

Each MPEG picture is broken down into a series of slices and each slice is comprised of a series of adjacent macroblocks.

MPEG pictures can be progressive sequence or interlaced. For the interlaced GOP comprises of field and/or frame pictures. For frame pictures, macroblock prediction scheme is based upon fields (partial frames) or complete frames.

MPEG encoder decides how many pictures will occur in a GOP, and how many B pictures will be interleaved between each pair of I and P pictures or pair of P pictures in the sequence. Because of picture dependencies, i.e., temporal compression, the order in which the frames are transmitted, stored or retrieved, is not necessarily the video display order, but rather an order required by the decoder to properly decode pictures in the bitstream.

MPEG compression employs two fundamental techniques: Motion compensation and Spatial Redundancy. Motion compensation determines how predicted or bi-directional frames relate to their reference frame. A frame is divided into 16×16 pixel units called macroblocks. The macroblocks in one frame are compared to macroblocks of another frame, similarities between the frames are not coded. If similar macroblocks shift position between frames, the movement is explained by motion vectors, which are stored in a compressed MPEG stream.

Spatial redundancy technique reduces data by describing differences within corresponding macroblocks. Spatial compression is achieved by considering the frequency characteristics of a picture frame. The process uses discrete cosine transform ("DCT") coefficients that spatially tracks changes in color and brightness. The DCTs are done on 8×8 pixel blocks. The transformed blocks are converted to the "DCT domain", where each entry in the transformed block is quantized with respect to a set of quantization tables. Huffman coding and zig-zag ordering is used to transmit the quantized values.

MPEG Decoding

MPEG Video decoders are known in the art. The video decoding process is generally the inverse of the video encoding process and is employed to reconstruct a motion picture sequence from a compressed and encoded bitstream. Generally MPEG video bitstream data is decoded according to syntax defined by MPEG standards. The decoder must first identify the beginning of a coded picture, identify the type of picture, and then decode each individual macroblock within a particular picture.

Generally, encoded video data is received in a rate or a video buffer verifier ("VBV"). The data is retrieved from the channel buffer by a MPEG decoder or reconstruction device for performing the decoding. MPEG decoder performs inverse scanning to remove any zig zag ordering and inverse quantization to de-quantize the data. Where frame or field DCTs are involved, MPEG decoding process utilizes frame and field Inverse Discrete Cosine Transforms ("IDCTs") to decode the respective frame and field DCTs, and converts the encoded video signal from the frequency domain to the spatial domain to produce reconstructed raw video signal data.

MPEG decoder also performs motion compensation using transmitted motion vectors to reconstruct temporally compressed pictures. When reference pictures such as I or P pictures are decoded, they are stored in a memory buffer. When a reconstructed picture becomes a reference or anchor picture, it replaces the oldest reference picture. When a temporally compressed picture, also referred to as a target frame, is received, such as P or B picture, motion compensation is performed on the picture using neighboring decoded I or P reference pictures. MPEG decoder examines motion vector data, determines the respective reference block in the reference picture, and accesses the reference block from the frame buffer.

After the decoder has Huffman decoded all the macroblocks, the resultant coefficient data is then inverse quantized and operated on by an IDCT process to transform macroblock data from a frequency domain to data in space domain. Frames may need to be re-ordered before they are displayed in accordance with their display order instead of their coding order. After the frames are re-ordered, they may then be displayed on an appropriate device.

FIG. 1 shows a block diagram of a typical MPEG decoding system, as is known in the art. Shown in FIG. 1 are a MPEG Demux 10, a MPEG video decoder 11 and an audio decoder 12. MPEG Demux 10 receives encoded MPEG bit stream data 13 that consists of video and audio data, and splits MPEG bit stream data 13 into MPEG video stream data 14 and MPEG audio stream data 16. MPEG video stream data 14 is input into MPEG video decoder 11, and MPEG audio stream data 16 is input into an MPEG audio decoder 12. MPEG Demux 10 also extracts certain timing information 15, which is provided to video decoder 11 and audio decoder 12. Timing information 15 enable video decoder 11 and audio decoder 12 to synchronize an output video signal 17 (raw video signal data) from video decoder 11 with an output audio signal 18 (raw audio data) from audio decoder 12.

MPEG video decoders may have a core processor for reconstructing decoded MPEG video data into raw video signal data, and a co-processor ("VLD") for doing variable length decoding of the MPEG video data stream. A direct memory access controller ("DMA") either associated with or incorporated into a host computer, or associated with or incorporated into the MPEG video decoder, manages data transfer between the core processor, VLD and various memory buffers.

Current decoding processors such as those manufactured by Equator Technology Inc. ("ETI") process data on an individual block by block basis, rather than a macroblock level. For component block by block decoding and transfer, the speed of the processing of an entire macroblock may be limited by data transfer speed. For example, if a data transfer mechanism is able to transfer 2 bytes per cycle, for a macroblock with six (6) 8×8 blocks comprising of 768 bytes of data, will require 384 cycles and an additional "y" number of cycles for overhead delay per transfer set. Hence, block by block decoding slows the overall decoding process.

Currently more DMA instructions are required to process each block of data vis-à-vis processing an entire macroblock of data. Also, conventional MPEG techniques have multiple waits for different DMA transfers and hence a significant amount of lead-time occurs that slows the overall decoding process.

Also, current decoding techniques adversely impact parallelism between VLD and the core processor and have inefficient VLIW pipelines. Furthermore, currently, VLD can only detect errors and is not able to correct those errors.

Therefore, a decoding system is needed that can efficiently transfer data between VLD and core processor, and also optimally utilize the resources of both processors, and perform error recovery in the core processor.

SUMMARY OF THE INVENTION

The present invention addresses the foregoing drawbacks by providing an apparatus and method that synchronizes data exchange between a core processor that includes a very long instruction word (VLIW) processor, and a variable length decoder (VLD) of an MPEG video decoder, and enhances core processor and co-processor parallelism.

According to one aspect, the present invention provides an incoming compressed and encoded MPEG video bit stream to a video decoder on a picture by picture basis. The input MPEG video stream data is organized into pictures and slices and further include macroblocks. Thereafter, VLIW adds a fake slice start code and fake macroblock data at the end of each MPEG input picture, and VLD utilizes the fake slice start code and fake macroblock data to skip to a next picture. The fake macroblock data indicates an error to VLD stopping the decoding process until the core processor reinitiates decoding of a selected slice.

VLIW then provides the input MPEG coded data stream to VLD on a picture by picture basis. VLD decodes the header of a current macroblock and the video data of a previous macroblock whose header has been decoded. The encoded MPEG video data includes DCT coefficients.

Thereafter, VLD transfers the current decoded header along with the decoded DCT coefficients of a previously decoded macroblock to the core processor on a macroblock by macroblock basis. VLIW performs motion vector reconstruction based upon decoded header data, inverse discrete cosine transforms based upon the decoded DCT coefficients, and motion compensation based upon reference data of a previous macroblock(s), and converts the data into raw video data.

The present invention has numerous advantages over the existing art. The decoding of an entire macroblock of video data assists in maintaining continues and efficient pipelined operation. Since a macroblock includes a macroblock header for a current macroblock and DCT coefficients for a previous macroblock, VLIW can easily locate data for motion vector reconstruction and compensation.

The foregoing aspects of the invention also simplify the decoding and reconstruction process because VLD decodes a macroblock header for a current macroblock, e.g. MB(i) and stores the decoded header data with a macroblock already decoded, e.g. MB(i−1), and transfers the decoded header and macroblock data (DCTs) to a data cache for access by VLIW. This enables VLIW to acquire reference data for a macroblock prior to performing motion compensation and IDCTs. This reduces idle time and improves decoding efficiency. VLIW architecture also allows simultaneous data processing and data transfer, and hence improves parallelism. Furthermore, since VLIW controls VLD operations, error handling is streamlined and hence improves performance.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWING

The use of similar reference numerals in different Figures indicates similar or identical items.

DETAILED DESCRIPTION OF THE PREFERRED EMBODIMENTS

Overall Architecture

Figure 1:
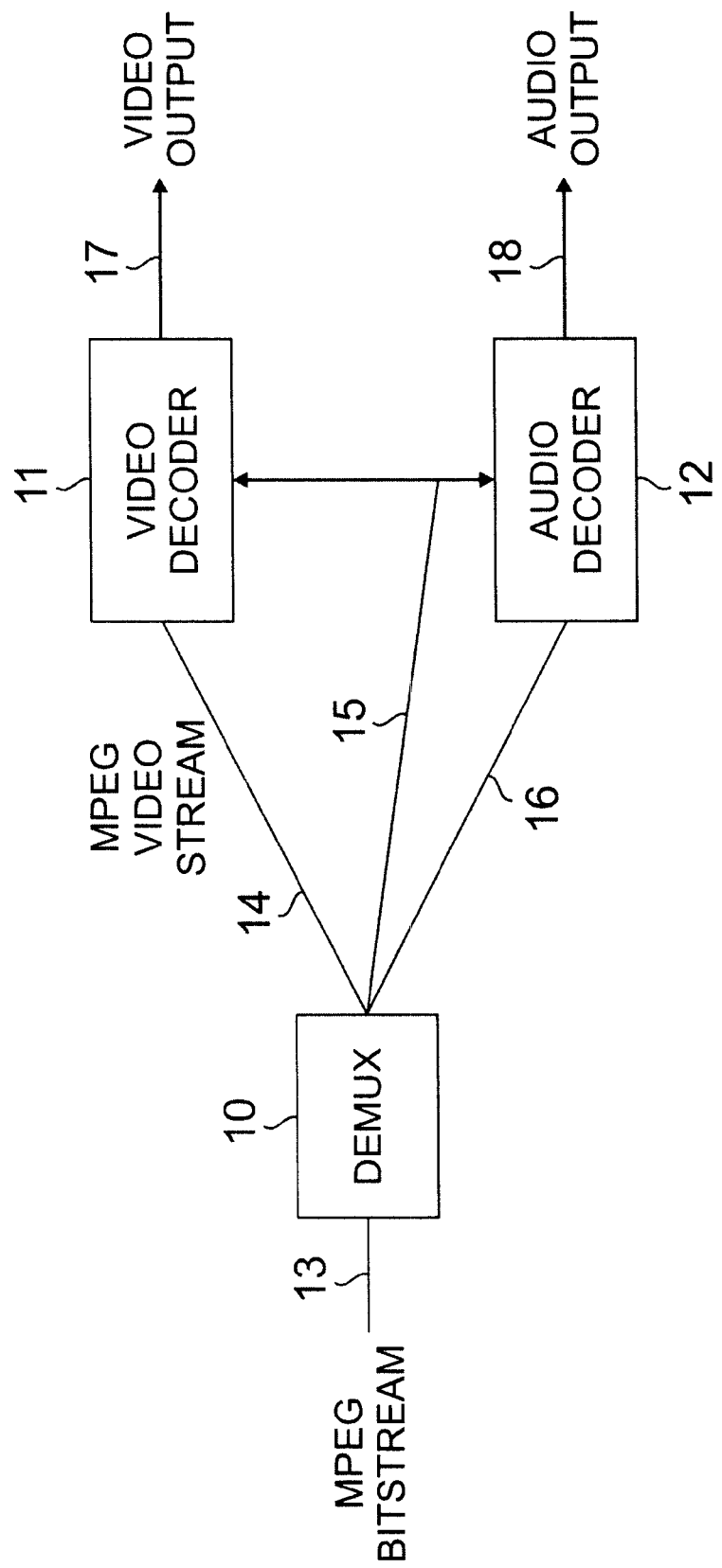
FIG. 1 shows a block diagram of a typical MPEG decoding system known in the art.
Figure 2A:
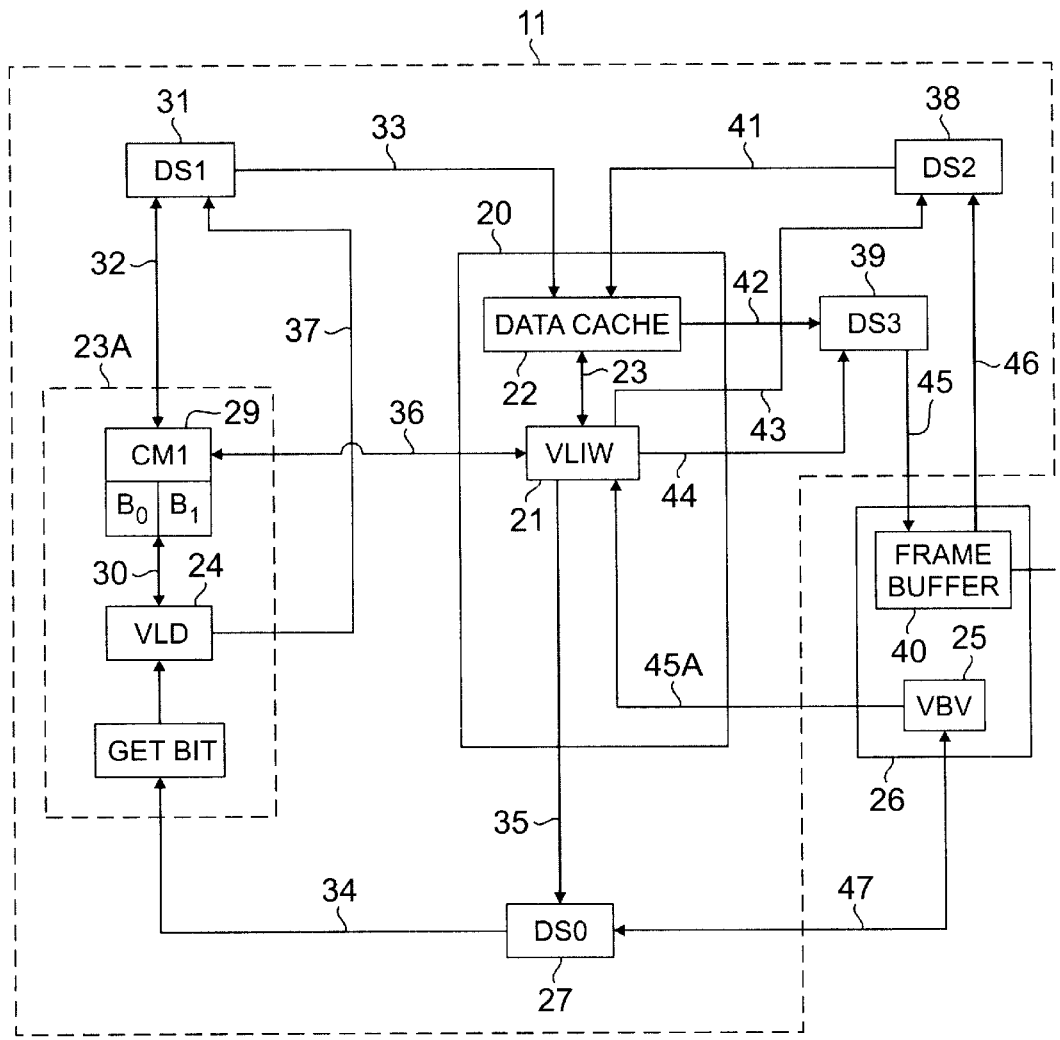
FIG. 2A shows a block diagram of a MPEG video decoder according to one aspect of the present invention.

FIG. 2A shows a schematic view of an MPEG video decoder 11, according one aspect of the present invention. MPEG video decoder 11 has a core processor 20, which includes a very long instruction word ("VLIW") processor 21. VLIW processor 21 utilizes instructions that are grouped together (i.e., very long) at the time of compilation of a computer program. As is well known in the art of VLIW processors, very long instructions are fetched and segregated for execution by VLIW processor 21, and dispatched to independent execution units.

VLIW processor 21 is connected to a data cache memory 22 over a bi-directional internal bus 23. VLIW 21 can read input MPEG video stream 14 buffered in VBV 25 contained within a memory device for example, SDRAM 26 which also includes a frame buffer 40 whose functionality is discussed in detail below.

Figure 2B:
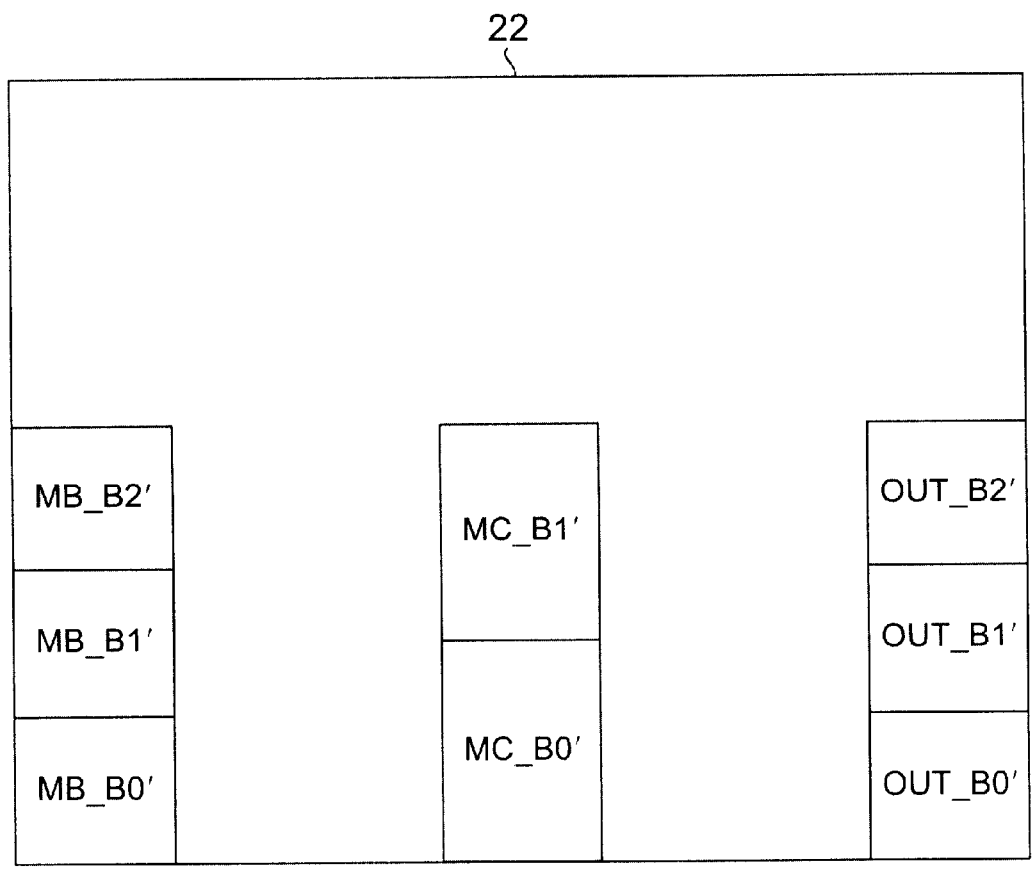
FIG. 2B shows a block diagram of data cache 22 memory buffers.

MPEG video decoder 11 also includes a co-processor 23a. Co-processor 23a has a variable length decoder ("VLD") 24 which decodes (Huffman decodes) incoming encoded MPEG video stream 14 to produce decoded MPEG video data from which core processor 20 can reconstruct and output raw video data. Co-processor 23a also has a memory ("CM1") 29 that has at least two buffers B0 and B1 to store at least two sets of macroblock data. CM1 29 is connected to VLD 24 over a bi-directional bus 30 and is also connected to a Direct Memory Access ("DMA") transfer unit, DS1 31, over a bus 32. DS1 31 in turn is also connected to data cache memory 22 via a bi-directional bus 33, and transfers data from CM1 29 memory buffers to data cache 22 memory buffers. FIG. 2B, as described below shows a block diagram of data cache 22 with various memory buffers.

VLD 24 has an input/output ("I/O") section, a GetBits engine ("GB") 28. VBV 25 supplies incoming MPEG video stream 14 to VLD 24 through DS0 27, where DS0 27 is another Direct Memory Access ("DMA") unit channel used for transferring data between VBV 25 and GetBits engine 28 via buses 34 and 47. GetBits engine 28 gets MPEG coded video bit stream 14 and transfers the data to VLD 24 through an input buffer (not shown).

VLIW processor 21 communicates command signals to DS0 27 over a command signal line 35. VLIW 21 can also read/write to CM1 29 over bus 36 and when VLIW 21 writes to CM1 29, VLD 24 can interpret the "writes" as a command. One such command is the "GO" command that allows VLD 24 to start decoding a macroblock. Also, VLD 24 can send data transfer commands to DS1 31 over command signal line 37.

It is noteworthy that core processor 20, co-processor 23a including all the data transfer elements can be integrated on a single chip. An example of such a chip is the MAP 1000A sold by Equator Technology.

FIG. 2A also shows various DMA elements utilized for storage and transfer of video data. FIG. 2A shows frame buffer 40, that receives output reconstructed raw video signal data from data cache memory 22 on a macroblock by macroblock basis via DMA transfer unit DS3 39, over buses 42 and 45. DS3 39 has three paths, designated for illustration purposes as DS3_0, DS3_1 and DS3_2 that allows simultaneous data transfer from data cache 22 to frame buffer 40. It is noteworthy that the invention is not limited to a three path DMA transfer unit. Frame buffer 40 also provides macroblock reference data for motion compensation to VLIW processor 21 through DMA transfer unit DS2 38, over buses 41 and 46.

FIG. 2B shows a block diagram of various memory buffers that can be included in data cache 22. FIG. 2B shows memory buffers MB_B0', MB_Bi' and MB_2' to receive data from CM1 29 via DS1 31. Also shown are buffers MC_B0', and MC_B1' to receive and store reference data for motion compensation from frame buffer 40 via DS2 38. Data cache 22 includes output memory buffers designated as OUT_B0', OUT_B1' and OUT_B2' for storing decoded raw video data. It is noteworthy that all three buffers can transfer data simultaneously via DMA DS3 39.

It is noteworthy that in one embodiment command lines/buses 34, 35, 37, 41, 42, 43, and 44 can be integrated into a single bus. Also buses 32 and 33 can be included in a single bus, and furthermore buses 45, 45A, 46 and 47 can be included in a single bus. In another embodiment all the command lines/buses, namely, 34,35,37,41,42,43,44, 45, 45A, 46 and 47 may be included on a single bus. FIG. 2A and FIG. 2B show the logic layout of the various buses and command lines, as discussed above.

Video Stream Decoding Using Fake Slice Code

Figure 3:
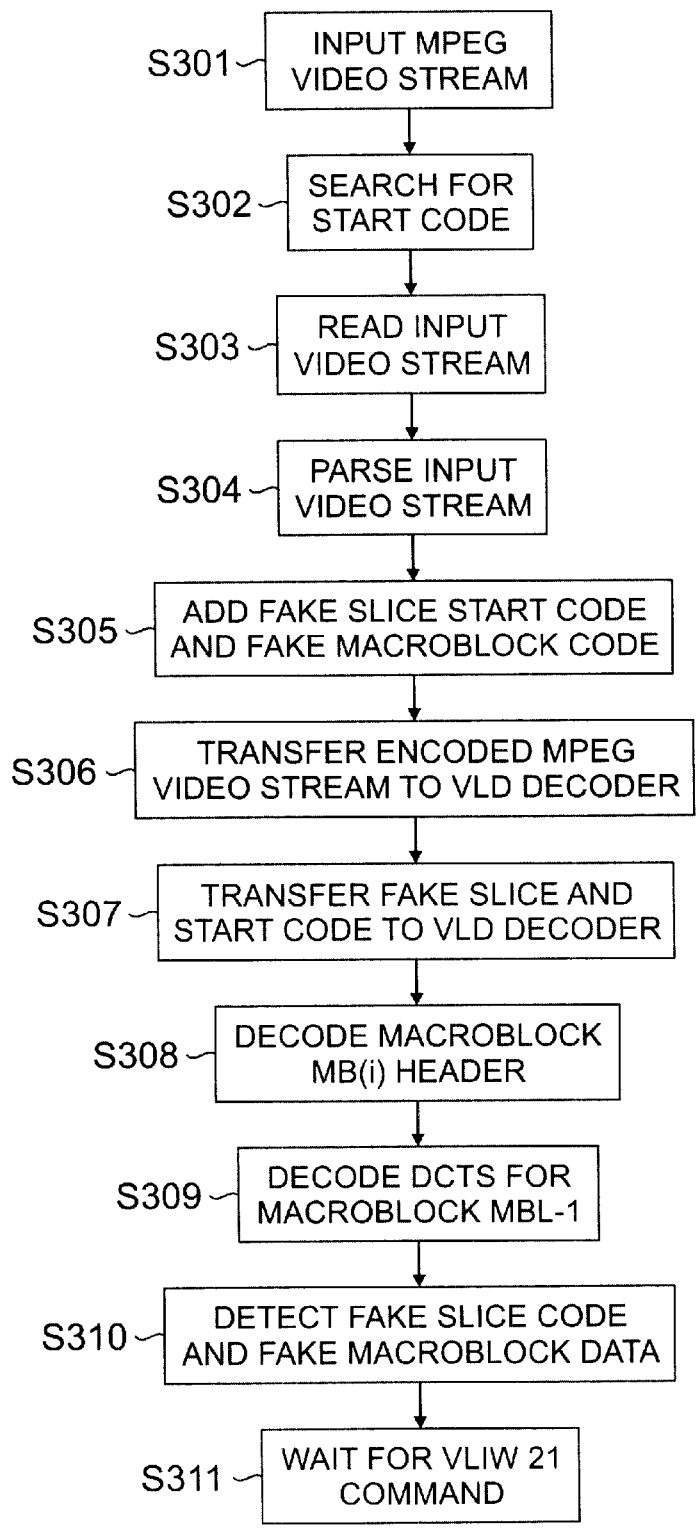
FIG. 3 shows a flow diagram of process steps for decoding MPEG video stream by using a fake slice start code and fake macro-block data.

FIG. 3 is flow diagram showing process steps according to one aspect of the present invention for decoding MPEG video stream 14 by using a fake slice start code and fake macro-block data.

In step S301, store input MPEG video stream 14 in VBV 25 in a non-coherent mode, i.e., no other copy of the data stream is made.

In step S302, VLIW 21 parses video bitstream data 14 stored in VBV 25 to search for the presence of start code of a picture. VLIW 21 also determines picture size ("picture_size") and stores the picture size in cache memory 22.

In step S 303, VLIW 21 reads input MPEG video stream 14.

In step S 304, VLIW 21 parses input MPEG video stream 14 and finds the end location of the slice. VLIW 21 follows MPEG standards to identify markers in the input MPEG video stream 14, as start and end positions of pictures and slices.

Figures 4, 5:
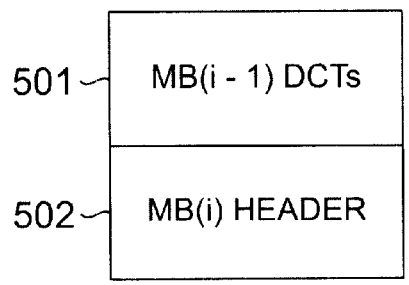
FIG. 4 is an example of macroblock data format with fake start code and fake macro block data.
FIG. 5 shows an example of a macroblock data structure.

In step S 305, VLIW 21 adds fake slice start code and fake macroblock data at the end of a picture. The picture data is appended with fake slice start code and fake macroblock data to facilitate macroblock level decoding and error handling. FIG. 4 shows an example of a macroblock data format 41 with fake start code 42 and fake macro block data 43. It is noteworthy that the invention is not limited to the shown fake start code format, any other format can be used to insert fake slice code. Fake macroblock data 43 is a macroblock header for pictures that indicates an error in the marker bit and will cause VLD 24 to stop decoding a current macroblock, and await further instructions (a "GO" command) from VLIW 21. By appending a fake slice start code to the end of the picture, VLD 24 skips to the next picture without actually decoding the data in the present picture.

In step S 306, VLIW 21 sets DSO 27 over control line 35 to transfer the encoded MPEG video stream 14 from VBV 25 to GetBits engine 28, and DSO 27 transfers encoded MPEG video data 17 to GetBits engine 28. VLIW 21 sends a first slice start code to VLD co-processor 23 for the purpose of slice level synchronization and also to enable VLD 24 to skip to another slice in a picture. An entire picture is transferred. This is the most efficient transfer mode, since a picture is the largest data entity. Transfer of smaller entities, such as a slice, results in a more complex pre-parsing workload for VLIW 21 and results in a complex data transfer system that can slow down the overall decoding process.

In step S307, DSO 27 transfers fake slice start code 42 and fake macroblock data 43 to GetBits engine 28.

In step S 308, VLD 24 decodes the macroblock header for macroblock i (MB (i). FIG. 5 shows an example of a macroblock data structure 500 that consists of a macroblock header 502 for a MB (i), and DCT coefficients 501 for the previously decoded macroblock MB (i-1). FIG. 5 macroblock structure improves decoding efficiency because while VLD 24 decodes a current header, it also decodes the DCTs of a previous macroblock simultaneously. VLIW 21 can also perform Inverse Discrete Cosine Transforms and motion compensation on a current macroblock and simultaneously perform motion vector reconstruction on two previous macroblock. This improves parallelism and also minimizes the number of memory buffers.

In step S 309, VLD 24 decodes DCTs for MB (i-1). The decoding algorithms used by VLD 24 are those recited by established MPEG standards and disclosed in U.S. patent application, Ser. No. 09/144,693, titled "SYSTEM AND METHOD FOR DECODING A VARIABLE LENGTH CODE DIGITAL SIGNAL", filed on Mar. 31, 1998, and assigned to the present assignee, The techniques are incorporated herein by reference.

In step S310, when commanded by VLIW 21, VLD 24 detects fake slice start code 42 and fake macroblock data 43 and in step S311, VLD 24 waits for a command from VLIW 21 to proceed with the next slice or picture.

Variable Length Decoding and Transfer of Decoded Data

Figure 6:
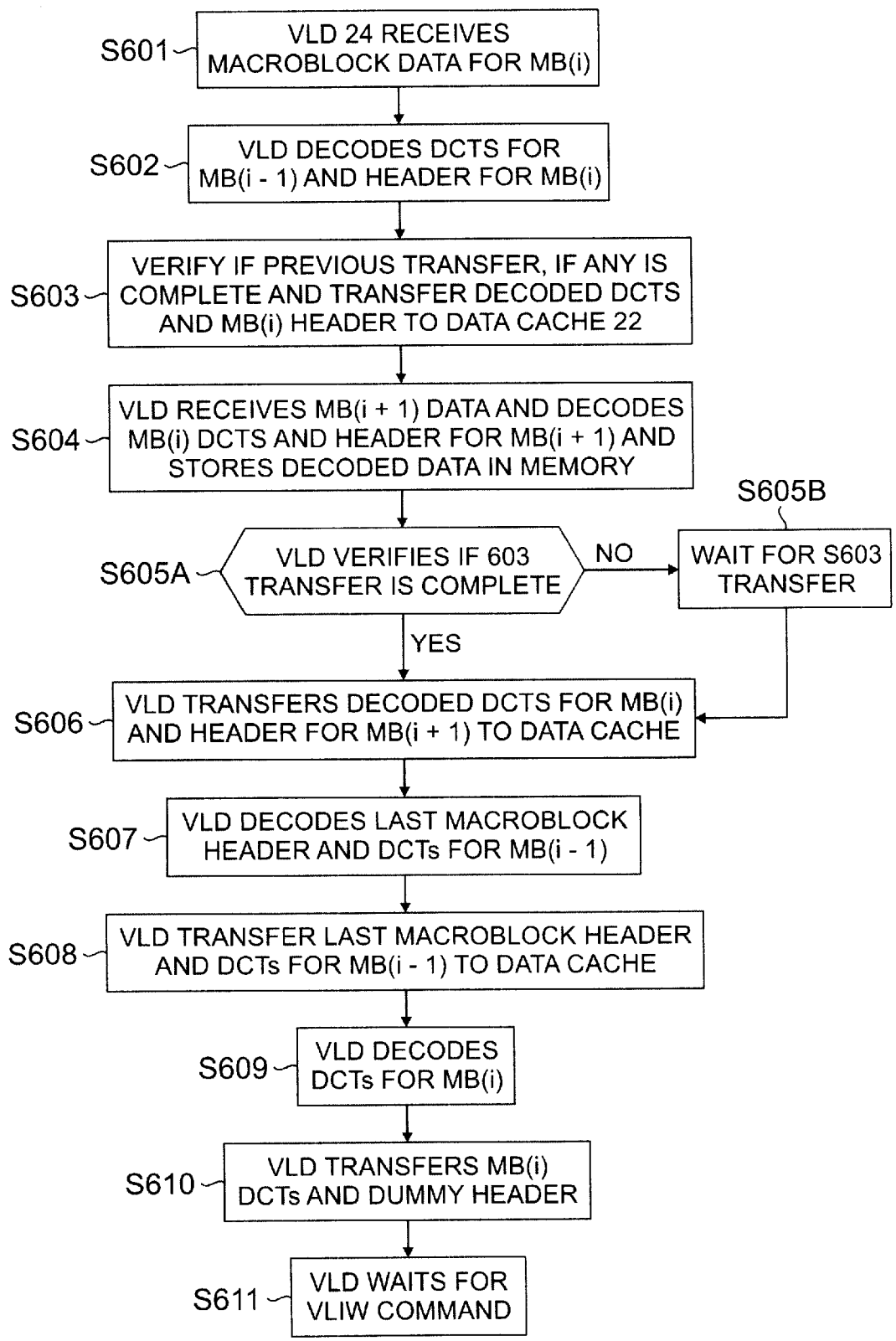
FIG. 6 shows a flow diagram of process steps according to one aspect of the present invention for decoding an MPEG video stream on a macroblock by macroblock basis.

FIG. 6 is a flow diagram showing process steps for macroblock level decoding by VLD 24 according to another aspect of the present invention.

In step S601, VLD 24 receives a macroblock, designated for illustration purposes as MB (i). VLD 24 receive MB (i) stored in VBV 25 based upon VLIW 21 command to DS0 27. Macroblock data is transferred from VBV 25 via DS0 27 using buses 34 and 47. Macroblock data is stored in an input buffer (not shown) in GetBits Engine 28 and then transferred to VLD 24 for decoding. As shown in FIG. 5, macroblock MB(i) has a header and DCT coefficients for macroblock MB (i-1).

In step S602, VLD 24 decodes DCT coefficients for MB (i-1), and also decodes macroblock header for MB (i), designated as HDR (i), using MPEG decoding techniques, incorporated herein by reference, and stores the decoded DCT coefficients and the decoded header in CM1 29 memory buffer B0.

In step S603, VLD 24 transfers decoded header HDR (i) and DCT coefficients of MB (i-1) from CM1 29 memory buffer, B0 to data cache 22 memory buffer, MB_B1' (FIG. 2A) via DS1 31 and buses 32 and 33 respectively.

In step S604, VLD 24 receives MB (i+1) data, and decodes DCTs for MB (i) and MB (i+1) header, using MPEG decoding techniques incorporated herein by reference, and stores the decoded data in CM1 29 memory buffer B1. The decoding process in step S604 and the transfer step of S603 are done simultaneously in parallel, and hence improves overall system performance.

In step S605A, VLD 24 verities if the transfer from CM1 29 memory buffer B0, in step S603 is complete. If the transfer is not complete, then in step S606B, VLD 24 waits till transfer from B0 is complete.

If step S603 transfer is complete, then in step S606, VLD 24 transfers the decoded MB (i+1) header and decoded DCT coefficients for MB (i), from CM1 29 memory buffer B1 to data cache 22 memory buffer MB_B1" via DS1 31 using buses 32 and 33, respectively. The foregoing steps (S601 to S606) are repeated till the last macroblock is reached.

In step S607, VLD 24 decodes the last macroblock designated as MB (I) header and DCT coefficients for the last but one macroblock MB (I-1), and stores the decoded data in CM1 29 memory buffer.

In step S608, VLD 24 transfers the decoded MB (I) header and decoded DCT coefficients for MB (I-1) from CM1 29 memory buffer to data cache 22 via DS1 31 using buses 32 and 33, respectively.

In step S609, VLD 24 decodes DCTs for MB (I) and stores the DCTs with a dummy header in CM1 29.

In step S610, VLD 24 transfers decoded DCTs for MB (I) and the dummy header from CM1 29 to data cache 22 via DS1 31 using buses 32 and 33 respectively.

In step S61 1, VLD 24 waits for the next slice in the input MPEG video stream 14 from GetBits engine 28. VLIW 21 indicates to VLD 24 which slice code corresponds to the next slice that is to be decoded, thereby enabling skipping slices or even moving to the next picture.

FIG. 6 process steps optimize MPEG decoding and data transfer because the decoded header of a current macroblock (MB (i)) and DCT coefficients of a previous macroblock (MB (i-1)) are packed together in the same memory buffer. Also, the decoding of a current macroblock is performed in parallel with data transfer from CM1 29 memory buffer to data cache 22. Furthermore, VLD 24 stops decoding when VLD 24 encounters an error due to fake slice code (FIG. 3) and waits for VLIW 21 commands, hence error handling is efficiently controlled by a central processor.

Motion Compensation and Motion Vector Reconstruction

Figure 7:
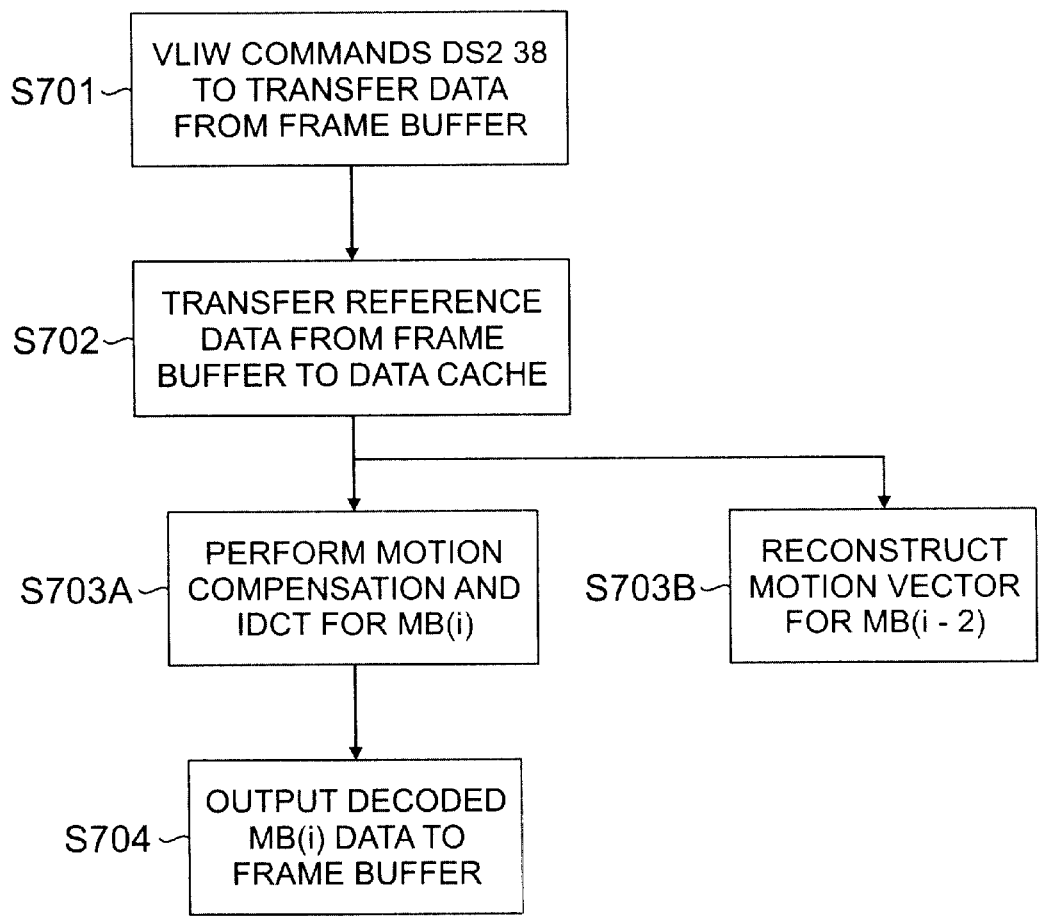
FIG. 7 shows process steps for performing motion compensation and motion vector reconstruction of a decoded output video stream.

FIG. 7 shows process steps according to another aspect of the present invention for performing motion compensation and motion vector reconstruction, for outputting decoded MPEG video stream 17 as raw video data.

In step S701, VLIW 21 commands DS2 38 via command line 43 to get reference data for a macroblock, e.g., MB (i) from frame buffer 40.

In step S702, DS2 loads reference data from frame buffer 40 to data cache 22, via buses 46 and 41 respectively and in parallel in step S703A, VLIW 21 reconstructs motion vector for MB (i−2). Motion vector data is stored in data cache 22, after VLD 24 decodes macroblock header and macroblock data, as discussed in FIG. 6 above.

In step S703B, VLIW 21 performs motion compensation and inverse discrete cosine transforms (IDCT) for MB (i−1) using well known MPEG techniques. It is noteworthy that step S703B occurs in parallel with S703A, if in step S702 data is still being loaded.

In step S704, VLIW 21 outputs decoded MB (i) IDCTs and motion compensation data as raw video data to frame buffer 40, from data cache 22 via DS3 39 and buses 42 and 43, respectively.

The advantage of the foregoing steps is that VLIW 21 can perform parallel processing in steps S703A and S703B. Loading reference data values into data cache memory 22 for an upcoming macroblock motion compensation and reconstruction operations can take considerable time. As shown above, during this downloading process, VLIW 21 processor can perform motion compensation and/or IDCTs on the DCTs of a previously decoded macroblock, and hence improve the overall decoding process. Furthermore, three macroblocks of data are processed with only two memory buffers.

Data Transfer Descriptors

Data transfer from, and to the various memory buffers is accomplished by using set of descriptors. Numerous sets of data descriptors are used for transferring data from one memory buffer to another in the foregoing decoding system. A set of descriptors include a source descriptor describing the data source and a destination descriptor describing where and in what format the data is transferred.

A set of descriptors is used to transfer data from CM1 29 to data cache 22 and another set for transferring data from data cache 22 to CM1 29. Another set of descriptors is used to transfer data from data cache 22 to get bits engine 28. Two other set of descriptors are used to transfer data from data cache 22 to frame buffer 40 as well as transfer from frame buffer 40 to data cache 22. An example of "source" and destination descriptors is provided below. It is noteworthy the examples below are to illustrate data descriptors and are not to limit the present invention. Other data descriptor formats may be used to implement the various aspects of the present invention.

Data from CM1 29 memory buffers B0 and B1 is transferred by using a Source Descriptor Set ("SDS") that includes descriptors 1 and 2. Descriptor 1 includes instructions to read from CM1 29 buffer, e.g. B0, using a mode, e.g., non-coherent and having a width, e.g., 832 bytes. Descriptor 2 has instructions to read from a buffer, e.g., B0' in cache memory 22, using a mode, e.g., coherent allocate, with a width of 64 bytes and a pitch of −64 bytes and a "halt after transfer" control instruction. The −64 byte pitch means that the buffer will be read repeatedly 13 times to equal the 832 bytes to zero out CM1 29 memory buffer.

Each data transfer also has a Destination Descriptor Set ("DDS"). DDS for data transfer from CM1 29 includes instructions to write to a destination buffer, e.g., B0' in cache memory 22, in a particular mode, e.g., coherent allocate, with a width of 832 bytes and a control instruction "no halt after transfer." DDS for transfer of data from data cache 22, includes instructions to write to a buffer, e.g., B0 in CM1 29 in a mode, e.g., non-coherent, with a width of 832 bytes, and a control instruction, e.g., "no halt after transfer." DDSs from CM1 29 designate buffers MB_B0', MB_B1' and MB_B2' in data cache 22 sequentially. Also DDSs from data cache 22 designate CM1 29 memory buffers B0 and B1 sequentially.

Task Synchronization Loops

FIGS. 8A–8L show process steps for the computer programmed operation of the decoder according to yet another aspect of the present invention, with groups of operations being performed simultaneously. Efficient scheduling in processing macroblock data is essential to optimize VLIW 21 and VLD 24 usage.

Various VLIW 21 processes and DMA transfers are incorporated in one trace i.e. motion vector reconstruction, motion compensation and IDCTs are performed continually with ongoing transfers without semaphore waits. A trace is a sequence of operations that are scheduled together. Traces are limited by module boundary (entry/return), loop boundary and previously scheduled code. Furthermore, all VLIW 21 execution components, motion compensation transfers, VLD 24 DMA transfers and output buffer transfers overlap for achieving maximum parallelism.

For illustration purposes, FIGS. 8A–8L process steps show decoding and DMA transfers for macroblocks, designated as MB0, MB1, MB3, MB4, MB5 and MB6 and MB7. This illustration is not to limit the invention and is only to show how different components operate within a continues time loop to achieve optimum efficiency. FIGS. 8A–8L process steps also show how decoded raw video data can be transferred to frame buffer 40 while other VLIW 21 and VLD 24 processes steps are being performed.

FIG. 8A

In step S800A, VLIW 21 parses MPEG video bitstream 14 at a picture and slice level. VLIW 21 also sets up DS0 27 for transferring bitstream 14 to VLD 24 via Getbits engine 28. In parallel, in step S800B, VLIW 21 sends a "Go" command to VLD 24, after VLD 24 has been initialized. Thereafter in step S800C slice processing begins and in step S800D VLIW 21 sends slice code for a given slice to VLD 24 by writing to CM1 29.

In step S801A, VLD 24 receives slice code and decodes MB0 header, and saves the decoded header in CM1 29 memory buffer, B0.

In step S801B, VLD 24 waits for DS1 31 to be ready for data transfer, and for a "GO" command from VLIW 21. VLD 24 also sends a "continue" command to DS1 31 to transfer CM1 29 memory buffer B0 data (i.e. decoded header of MB0) with dummy coefficients to data cache 22 memory buffer MB_B0'.

In step S802A, DS1 31 transfers decoded MB0 header data from CM1 29 memory buffer, B0 to data cache 22 memory buffer, MB_B0', and in parallel, in step S802B, VLD 24 decodes DCT coefficients of MB0 and the header for MB1, and saves the decoded data in CM1 29 memory buffer B1.

It is noteworthy that DS1 31 data transfer and VLD 24 decoding of MB0 DCT coefficients and MB1 header occur simultaneously, and hence improves efficiency.

FIG. 8B

In step S803A, VLIW 21 sends a "GO" command to VLD 24 to proceed with the next macroblock, and VLIW 21 also waits for DS1 31 transfer in step S802A. In parallel, in step S803B, VLD 24 waits for DS1 31 to finish transfer of data from memory buffer B0 (in step S802A) and wait for a "GO" command from VLIW 21. VLD 24 also sends a "continue" command to DS1 31 to start transfer of decoded DCT coefficients of MB0 and decoded header of MB1 from CM1 29 memory buffer B1 to data cache 22 memory buffer, MB_B1', after data transfer in step S802A.

In step S803C, VLIW 21 reconstructs motion vector based upon decoded MB0 header data stored at data cache 22 memory buffer MB_B0'. VLIW 21 also set's up descriptors for transfer of reference data from frame buffer 40 to data cache 22 for motion compensation of MB0.

In step S803D, DS1 31 transfers data stored in CM1 29 memory buffer B1 (i.e. decoded DCT coefficients of MB0 and decoded header of MB1) to data cache 22 memory buffer, MB-B1'.

In step S803E, after receiving the "GO" command from VLIW 21, VLD 24 decodes DCT coefficients of MB1 and header for MB2, and saves decoded DCTs of MB1 and header MB2 in CM1 29 memory buffer, B0. It is noteworthy that process steps S803C–S803E occur simultaneously, and while data is being transferred from CM1 29 buffer B1 in step S803D, VLD 24 decodes DCT coefficients and header of the next macroblock. Hence process steps for decoding, data transfer and storage of decoded data are synchronized to minimize VLD 24 idle time.

FIG. 8C

Steps 804A–F show various operations performed by VLD 24 and VLIW 21 simultaneously, while various DMA channels transfer data. The various process steps as discussed below are synchronized to minimize time delay.

In step S804A, VLIW 21 waits for DS1 31 to transfer data (in step S803D), and sends a "GO" command to VLD 24 to proceed with the next block. VLIW 21 also sends a continue command to DS2 38 to transfer reference data from frame buffer 40 to data cache 22 memory buffer MC-B0.

In step S804B, parallel to step S804A, VLD 24 waits for DS1 transfer in step S803D, and for a "GO" command from VLIW 21. VLD 21 also sends a "continue" command to DS1 29 to transfer CM1 29 memory buffer B0 data (i.e. decoded DCT coefficients for MB1 and decoded header for MB2) to data cache 22 memory buffer, MB_B2'.

In step S804C, VLIW 21 reconstructs motion vector for MB1 based upon the decoded MB1 header data stored in data cache 22 memory buffer, MB-B1'. VLIW 21 also set's up the descriptor set for DS2 38 to transfer reference data for motion compensation for MB1.

In step S804D, in response to the "continue" command from VLIW 21, DS2 38 transfers reference data for MB0 from frame buffer 40 to data cache 22 memory buffer, MC_B0'.

In step S804E, DS1 31 transfers data (decoded DCT coefficients for MB1 and header for MB2) from CM1 29 memory buffer B0 to data cache 22 memory buffer, MB_B2'.

In step S804F, VLD 24 decodes DCT coefficients for MB2 and header for MB3, and stores the decoded DCT coefficients and decoded header in CM1 29 memory buffer, B1.

It is noteworthy that process steps S804C to S804F occur in parallel, and hence improve the overall efficiency of the decoding process.

FIG. 8D

In step S805A, VLIW 21 waits for DS1 31 data transfer in step S804E, and sends a "GO" command to VLD 24 to proceed with the next macroblock. VLIW 21 also waits for DS2 38 transfer of reference data for MB0 in step S804D, and also sends a "continue" command for transfer of reference data for MB1.

Parallel to step S805A, in step S805B, VLD 24 waits for DS1 31 data transfer in step S804E, and for a "GO" command from VLIW 21 to proceed with the next macroblock. VLD 24 also sends a "continue" command to DS1 31, to transfer data from CM1 29 memory buffer, B1 after step S804E.

In step S805C, VLIW 21 reconstructs motion vector for MB2 based upon decoded data stored in data cache 22 memory buffer, MB_B2', and set's up descriptors for DS2 38 to transfer reference data for MB1 motion compensation. Thereafter, VLIW 22 performs motion compensation for MB0 based upon reference data stored in data cache 22's memory buffer MC_B0', and perform IDCTs for MB0 based upon decoded DCT coefficients stored in MB-B1'. Thereafter, VLIW 21 adds IDCTs and motion compensation data, and saves the MB0 IDCTs and motion compensation data in data cache 22, output buffer, Out_B0'.

In step S805D, DS2 38 loads reference data for MB1 to data cache 22 memory buffer, MC_B1'.

In step S805E, DS1 31 transfers decoded DCT coefficients of MB2 and decoded header of MB3 from CM1 29 memory buffer B1 to data cache 22 memory buffer, MB_B0'.

In step S805F, after receiving the "GO" command from VLIW 21, VLD 24 decodes DCTs for MB3 and header for MB4, and stores the decoded DCT coefficients and decoded header in CM1 29 memory buffer B0.

It is noteworthy that steps S805C–S805F occur simultaneously and improves parallelism between VLD 24 and VLIW 21 while efficiently transferring data using DMA channels DS1 31 and DS2 38.

FIG. 8E

In step S806A, VLIW 21 sends a ""GO" command to VLD 24, and waits for DS1 31 transfer in step S805E. VLIW 21 also sends a "continue" command to DS3_0 39 to transfer decoded MB0 data from data cache 22 Output buffer, Out_B0' to SDRAM frame buffer 40, and to DS2 38 to load reference data for MB2 from SDRAM frame buffer 40 to data cache 22.

Parallel to step S806A, in step S806B, VLD 24 waits for DS1 31 to transfer in step S805C, and waits for a "GO" command from VLIW 21. VLD 24 also sends a "continue" command to CM1 29 memory buffer B1, to transfer data after step S805C.

In step S806C, VLIW 21 reconstructs motion vector for MB3 based upon decoded MB3 data stored in data cache 22 memory buffer, MB-B0', and set's up descriptors for DS2 38 to load MB3 reference data. Thereafter, VLIW 21 performs motion compensation and IDCTs for MB1 based upon reference data stored in MC_B1' and DCT coefficients stored in data cache 22 memory buffer, MB_B2' respectively. VLIW 21 also adds IDCTs and motion compensation data for MB1, and saves the added data in data cache 22, Output memory buffer, Out_B1'.

In step S806D, DS2 38 transfers reference data for MB2 from frame buffer 40 to data cache 22 memory buffer, MC_B0'.

In step S806E, DS3_0 39 transfers MB0 decoded pixels from data cache 22 output buffer, Out_B0' to frame buffer 40.

In step S806F, DS1 31 transfers data decoded header for MB4 and DCT coefficients for MB3 from CM1 29 memory buffer, B0 to data cache 22's memory buffer, MB_B1'.

In step S806G, VLD 24 decodes MB4 DCT coefficients and header for MB5, and thereafter saves the decoded data in CM1 29 memory buffer B1.

Figure 8A:
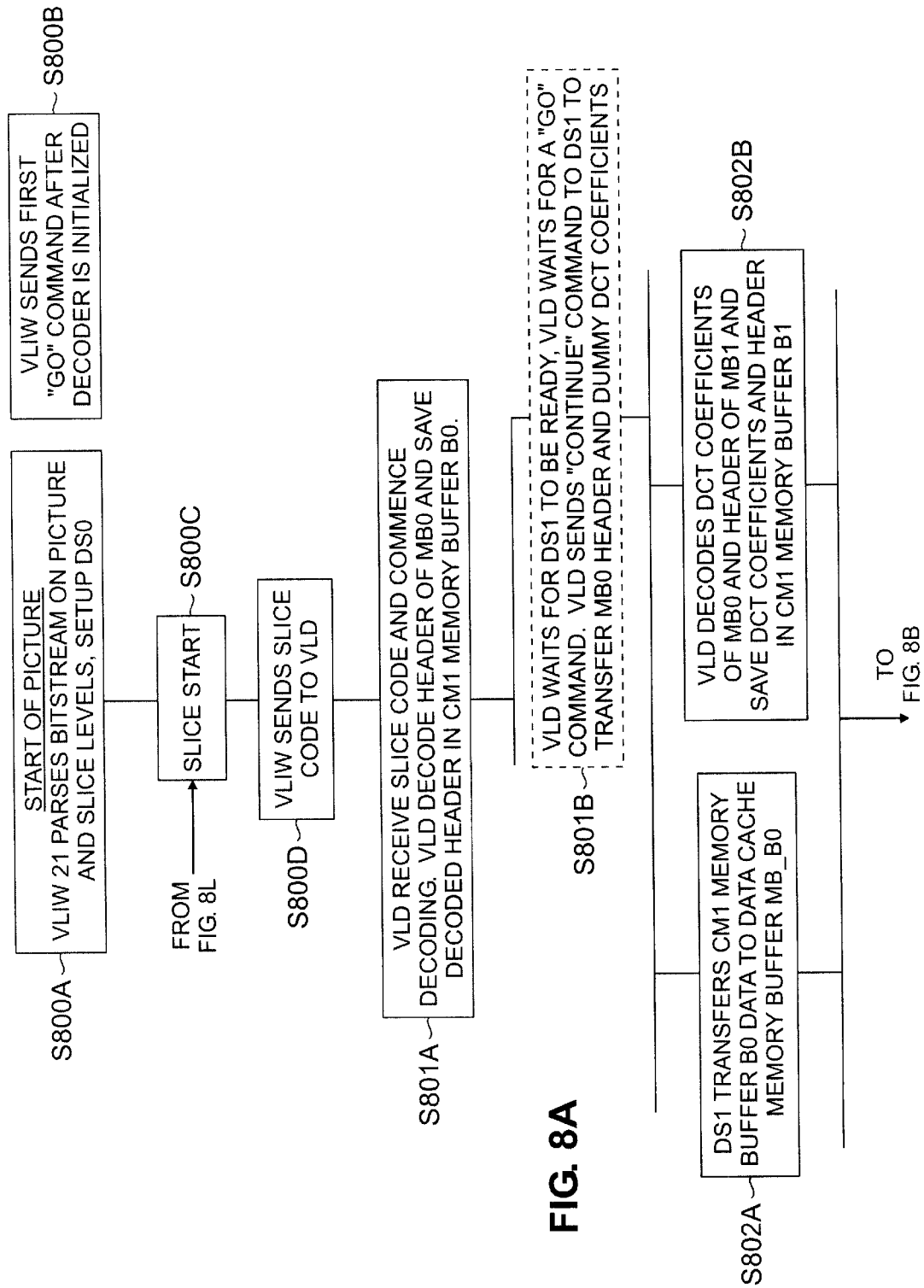
FIGS. 8A–8L shows a flow chart according to another aspect of the present invention illustrating the general processing, and groups of processes performed by various components of a MPEG video decoder.
Figure 8B:
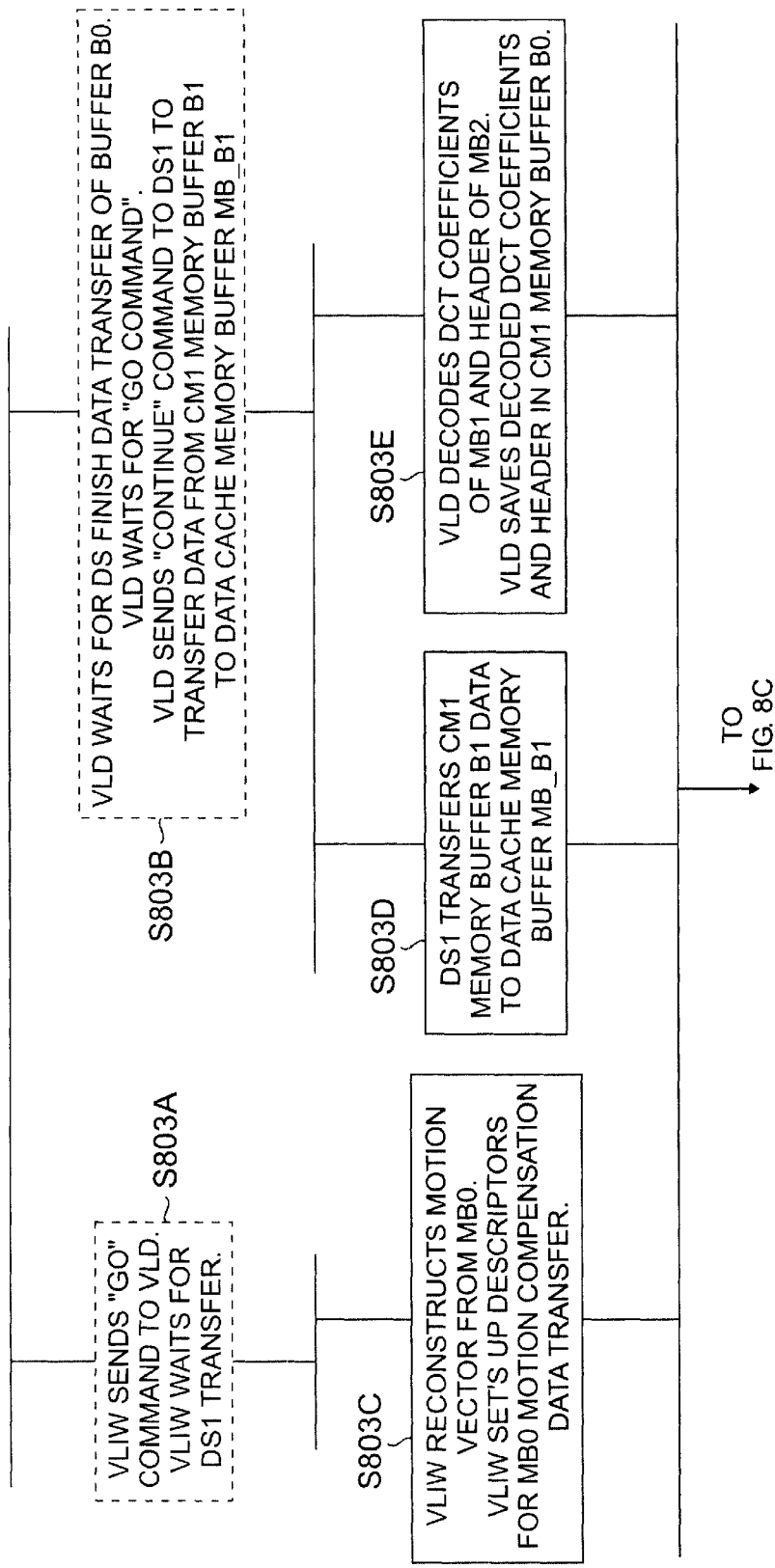
Figure 8C:
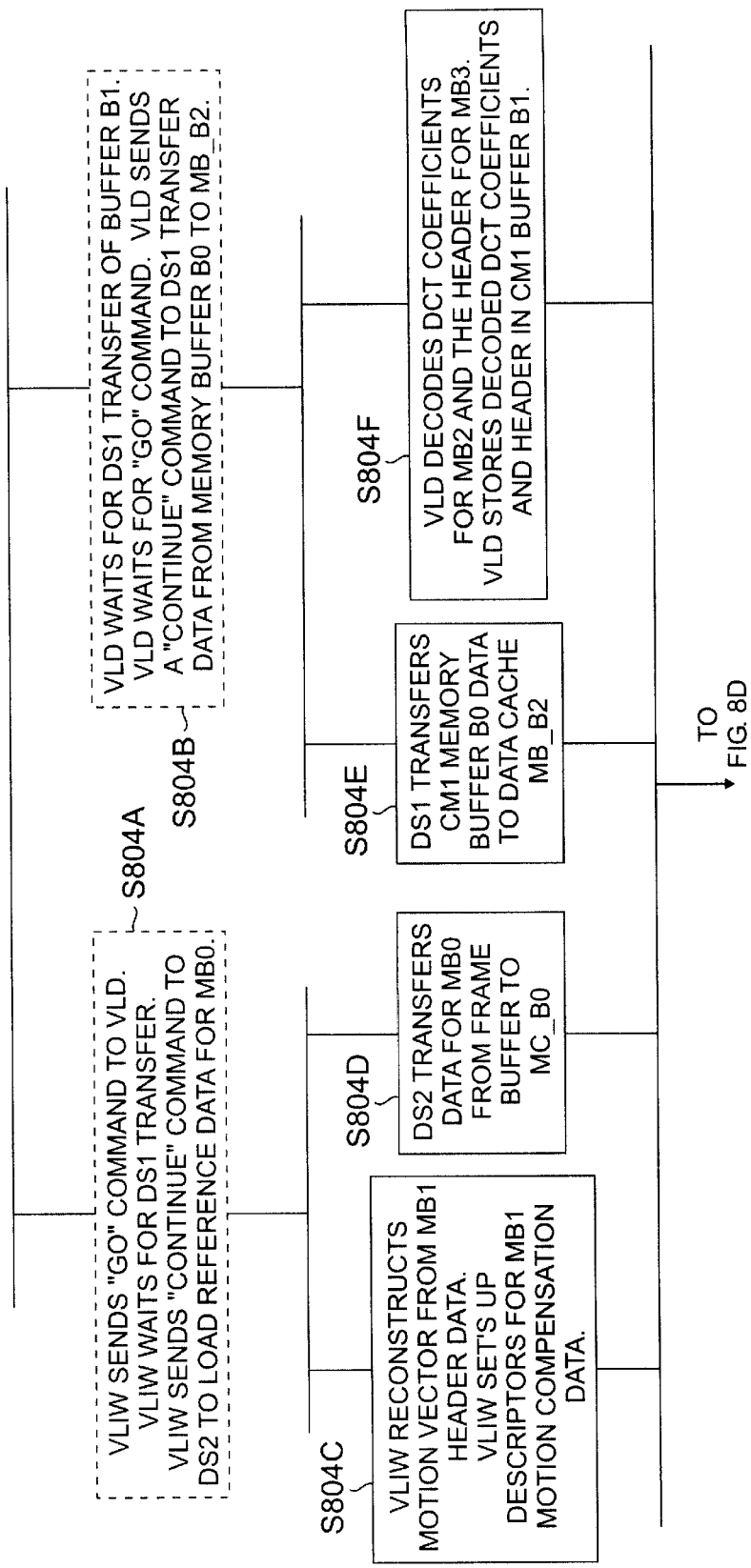
Figure 8D:
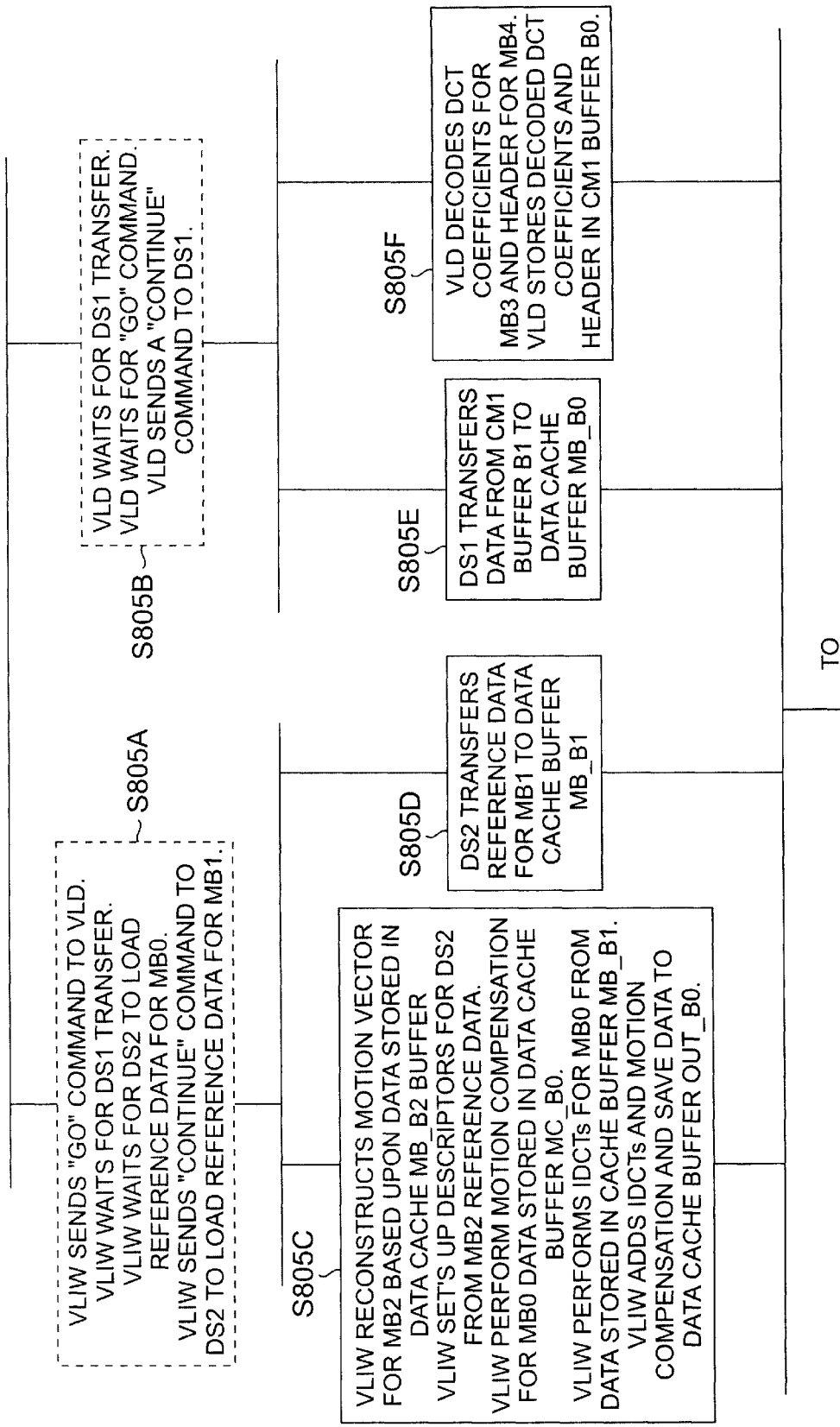
Figure 8E:
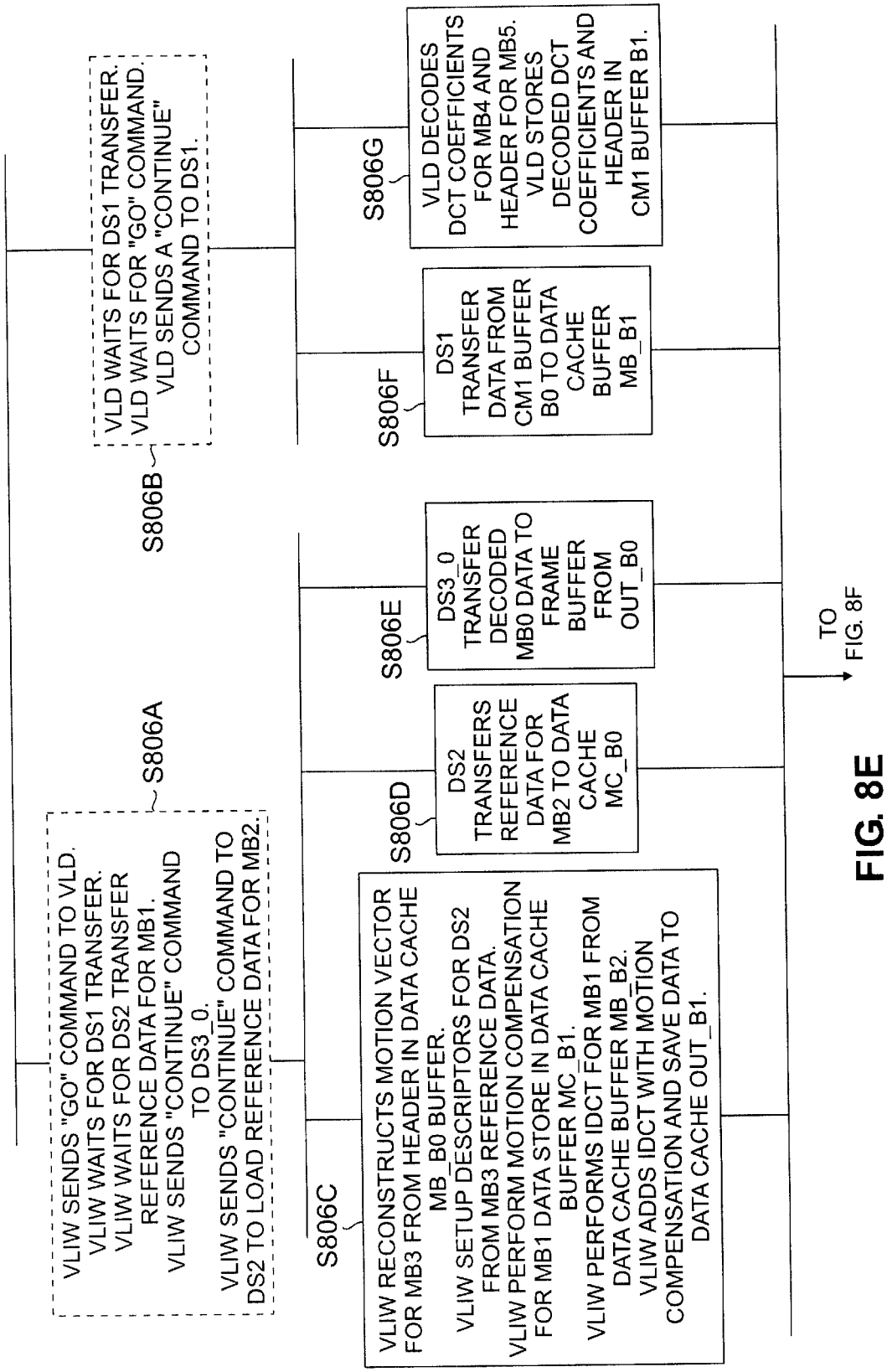
Figure 8F:
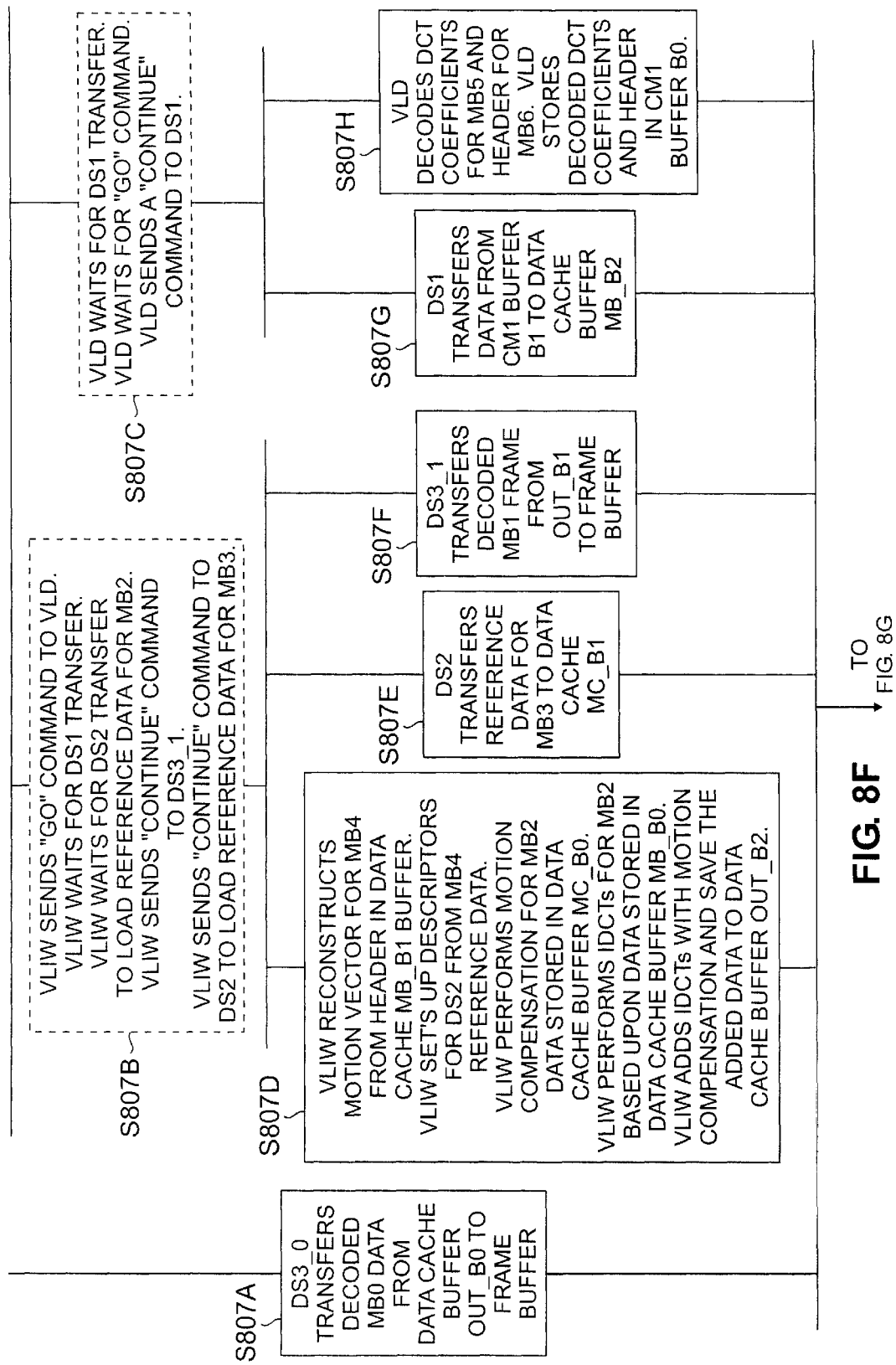

It is noteworthy that steps S806C–S806G occur simultaneously and hence improves VLIW pipeline as well parallelism between VLD 24 and VLIW 21, while efficiently transferring data using various DMA data transfer channels.
FIG. 8F FIG. 8F shows that in step S807A, DS3_0 39 continues to transfer (From FIG. 8E) decoded pixel data of MB0 from data cache 22 output memory buffer, OUT_B0' to frame buffer 40, while other VLD 24 and VLIW 21 operations are being performed.

In step S807B, VLIW 21 waits for DS1 31 to finish data transfer in step 806D, and sends a "GO" command to VLD 24. VLIW 21 also waits for DS2 38 to transfer reference data for MB2 in step S806D, and data transfer by DS3_0 39 in step S807A. VLIW 21 also sends a continue command to DS2 38 (for transfer of reference data for MB3) and to DS3_1 39 for transfer of decoded data from data cache 22 output memory buffer, Out_B1' after step S807A.

In step S807C, VLD 24 waits for DS1 31 data transfer is step S806F, and waits for a "GO" command from VLIW 21 to proceed with the next macroblock. VLD 24 sends a continue command to DS1 31 to transfer data from CM1 29 memory buffer, B0 after data transfer from memory buffer B1 in step S806F.

It is noteworthy that steps S807A–S807C occur simultaneously.

In step S807D, VLIW 21 reconstructs motion vector for MB4 based upon decoded MB4 data stored in data cache 22 memory buffer, MB_B1', and sets up descriptors for DS2 38 to transfer reference data for MB4. VLIW 21 also performs motion compensation for MB2 based upon reference data stored in data cache 22 memory buffer, MC_B0', and also performs IDCTs for MB2 based upon decoded DCT coefficients stored in data cache 22 memory buffer, MB_B0'. VLIW 21 adds the IDCTs and motion compensation results and saves the added data in data cache 22 output memory buffer, OUT_B2'.

In step S807E, DS2 38 transfers reference data for MB3 from frame buffer 40 to data cache 22 memory buffer, MC_B1'.

In step S807F, DS3_1 39 transfers decoded pixels for MB1 from data cache 22 output memory buffer, Out-B1' to frame buffer 40.

In step S807G, DS1 31 transfers decoded header for MB5 and decoded DCT coefficients for MB4 from CM1 29 memory buffer B1 to data cache 22 memory buffer, MB_B2'.

In step S807H, after receiving a "GO" command from VLIW 21, VLD 24 decodes DCT coefficients for MB5, and decodes the header for MB6. VLD 24 saves the decoded MB5 DCT coefficients and MB6 header in CM1 29 memory buffer, B0.

Figure 8G:
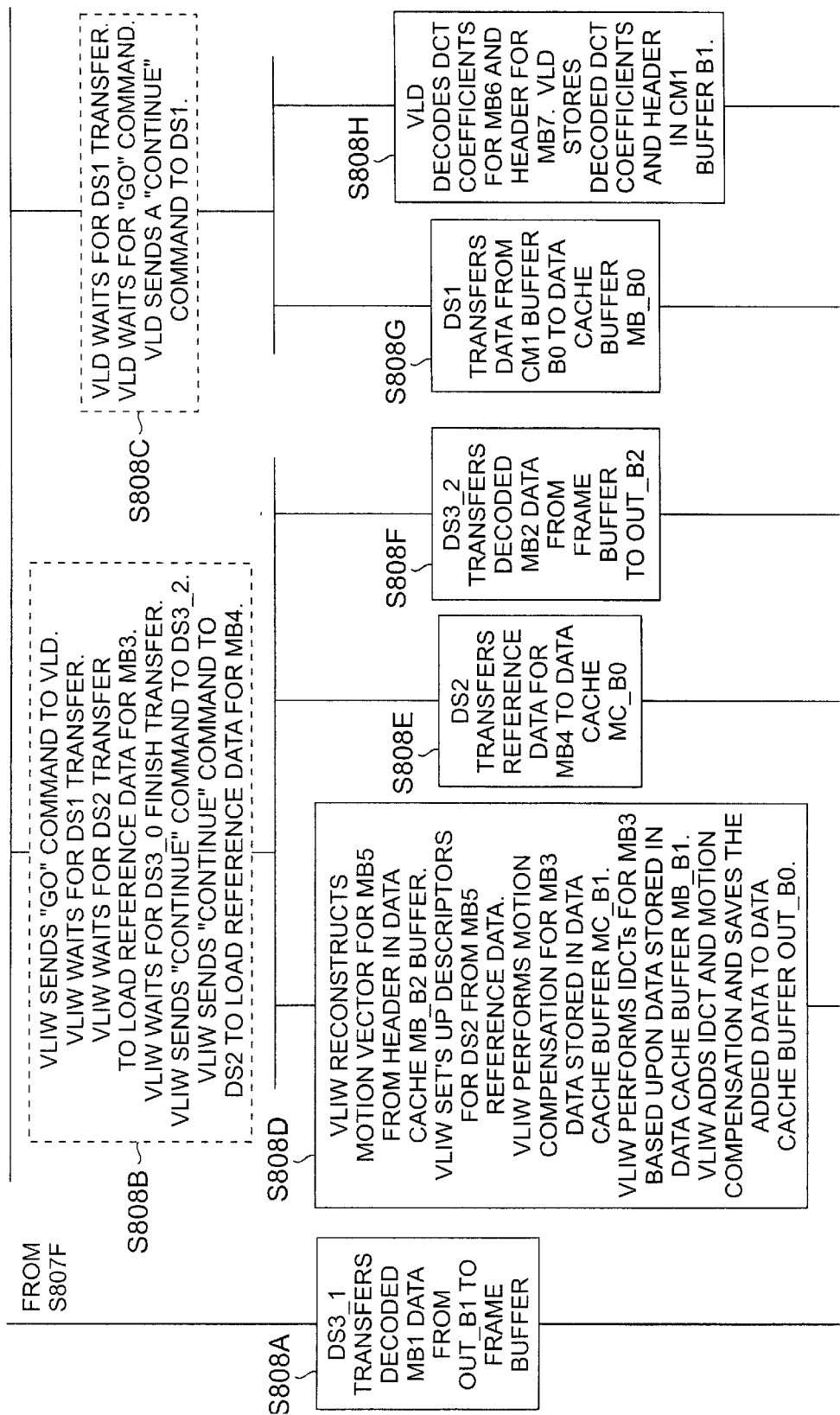

It is noteworthy that steps S807A, S807D–S807H occur in parallel.
FIG. 8G

In step S808A, DS3_1 39 continues to transfer of decoded MB1 pixels.

In step S808B, VLIW 21 waits for DS1 31 data transfer in step S807G, and also sends a "GO" command to VLD 24 to proceed with the next macroblock. VLIW 21 also waits for DS2 38 transfer in step S808E, and sends a "continue" command to DS2 38 to transfer reference data for MB4. VLIW 21 also waits for DS 3_0 to output data to frame buffer 40 in step S 807A and sends a "continue" command to DS3_2 39 to transfer MB2 decoded pixel data from data cache 22 memory buffer, Out_B2' to frame buffer 40.

In step S808C, VLD waits for DS1 31 transfer in step S807G, and for a "GO" command from VLIW 21 to proceed with the next macroblock. VLD 24 also sends a "continue" command to DS1 31 to transfer data from CM1 29 memory buffer B0, after step S807G.

In step S808D, VLIW 21 reconstructs motion vector for MB5 from data stored in data cache 22 memory buffer MB_B2', and set's up descriptors for DS2 38 to transfer reference data for MB5. VLIW 21 performs motion compensation and IDCTs for MB3 based upon reference data stored in MC_B1' and decoded DCT coefficients stored in data cache 22 memory buffer, MB_B1' respectively. Thereafter, VLIW 21 adds the IDCTs and motion compensation data, and saves the data in data cache 22 output memory buffer, Out_B0'.

In step S808E, DS2 38 transfers reference data for MB4 from frame buffer 40 to data cache 22 memory buffer, MC_B0'.

In step S808F, DS3_2 39 starts transfer of decoded pixels for MB2 to frame buffer 40. It is noteworthy that data transfers in steps S807A, 808A and 808F occur simultaneously. Hence the three paths of DS3 39 i.e. DS3_0, DS_1 and DS_2 can simultaneously transfer decoded MPEG video stream to frame buffer 40.

In step S808G, DS1 31 transfers decoded header for MB 6 and DCT coefficients for MB5 from CM1 29 memory buffer B0 to data cache 22 memory buffer, MB_B0'.

In step S808H, after receiving the "GO" command from VLIW 21, VLD 24 decodes the header for MB7 and DCT coefficients for MB6, and stores the decoded data in CM1 29 memory buffer B1.

Figure 8H:
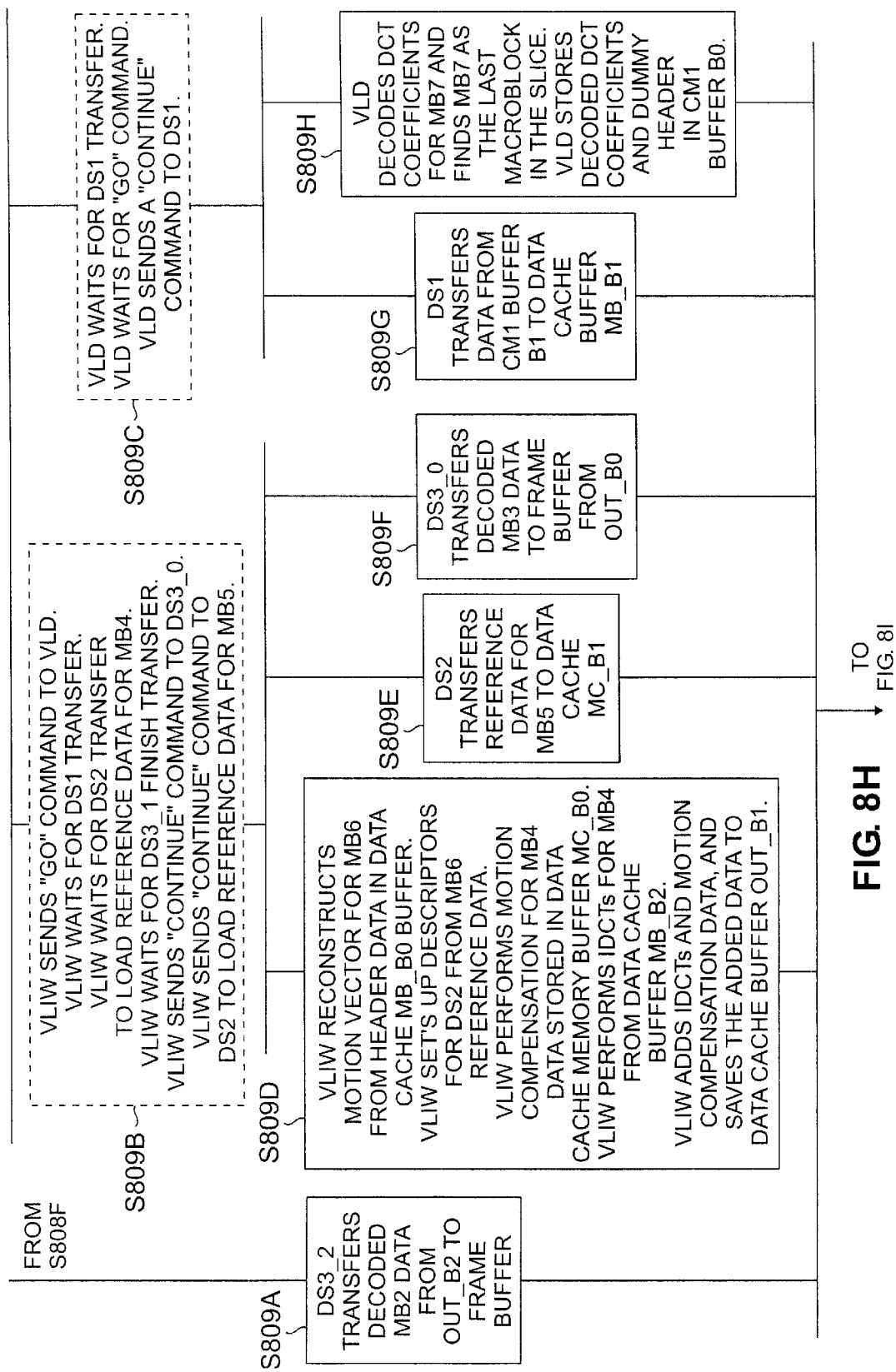
Figure 8I:
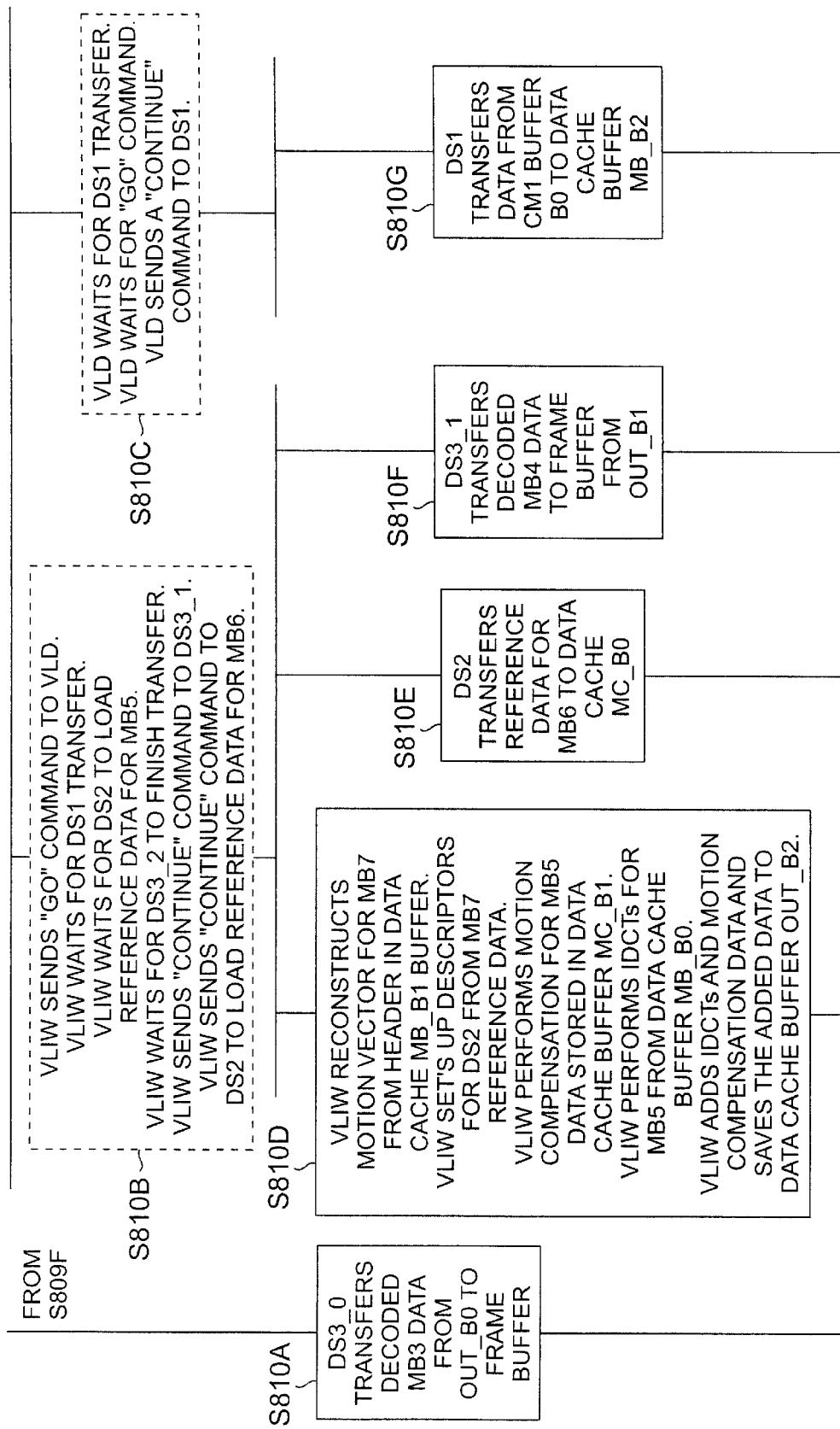
Figure 8J:
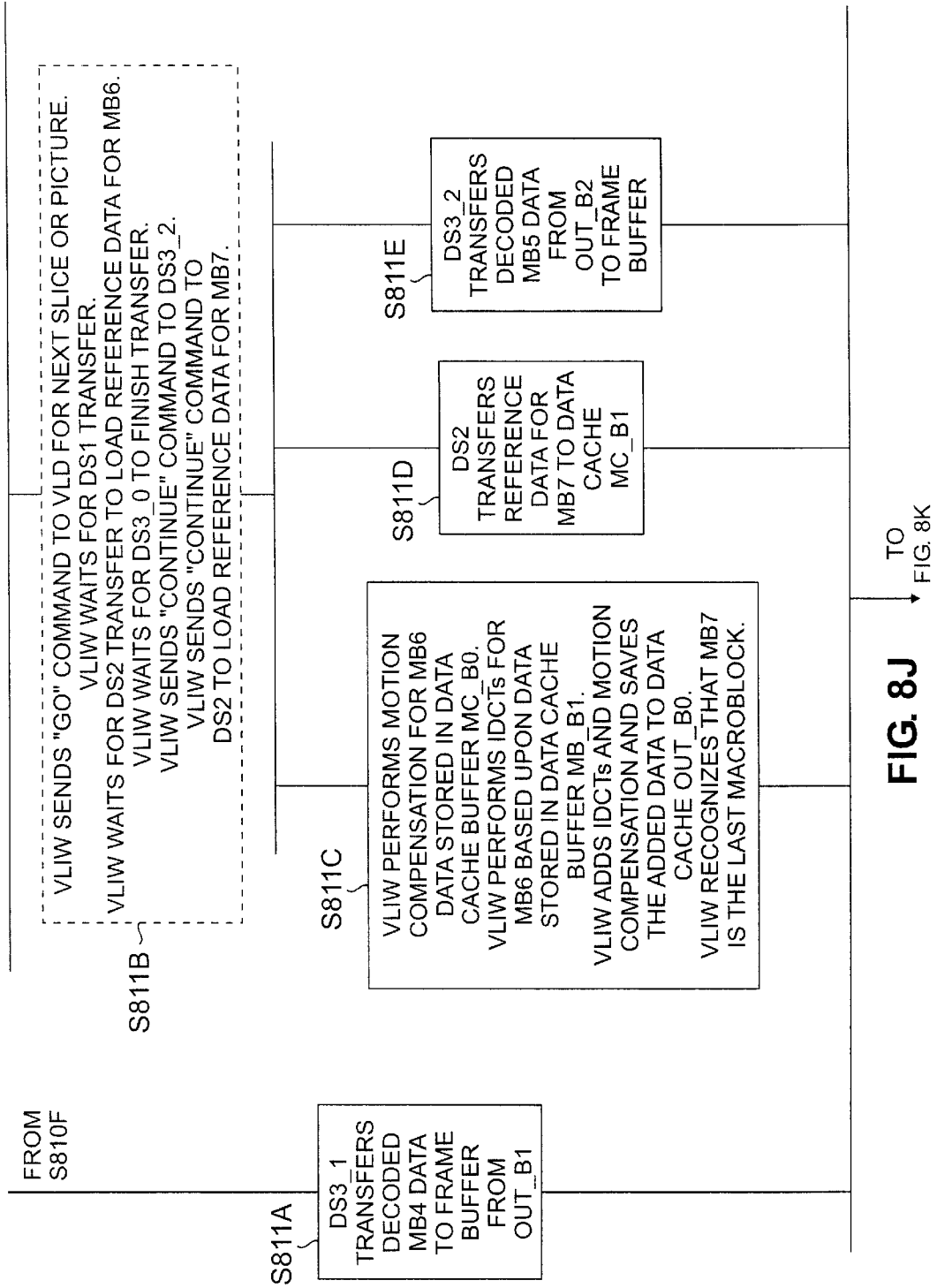
Figure 8K:
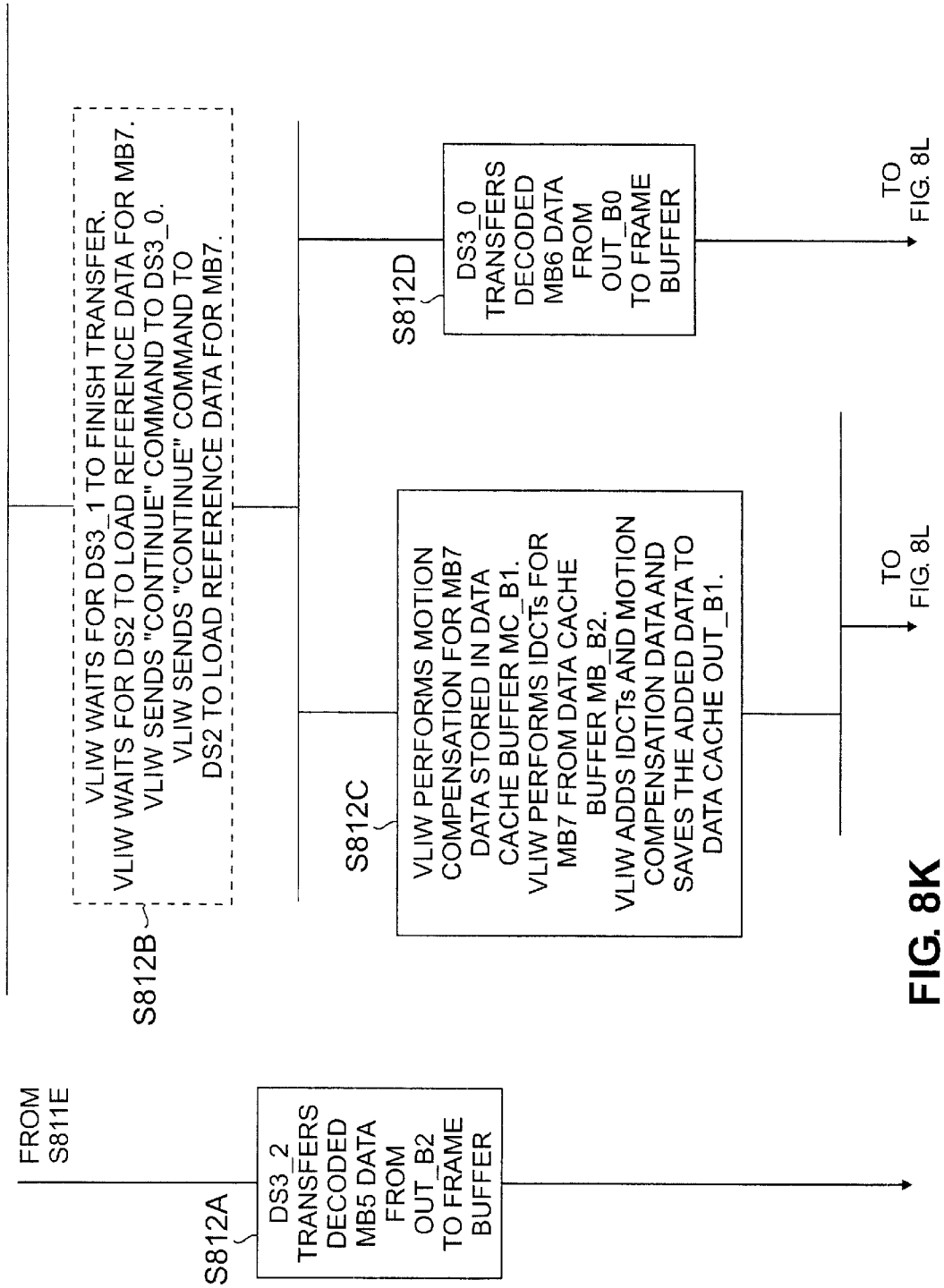
Figure 8L:
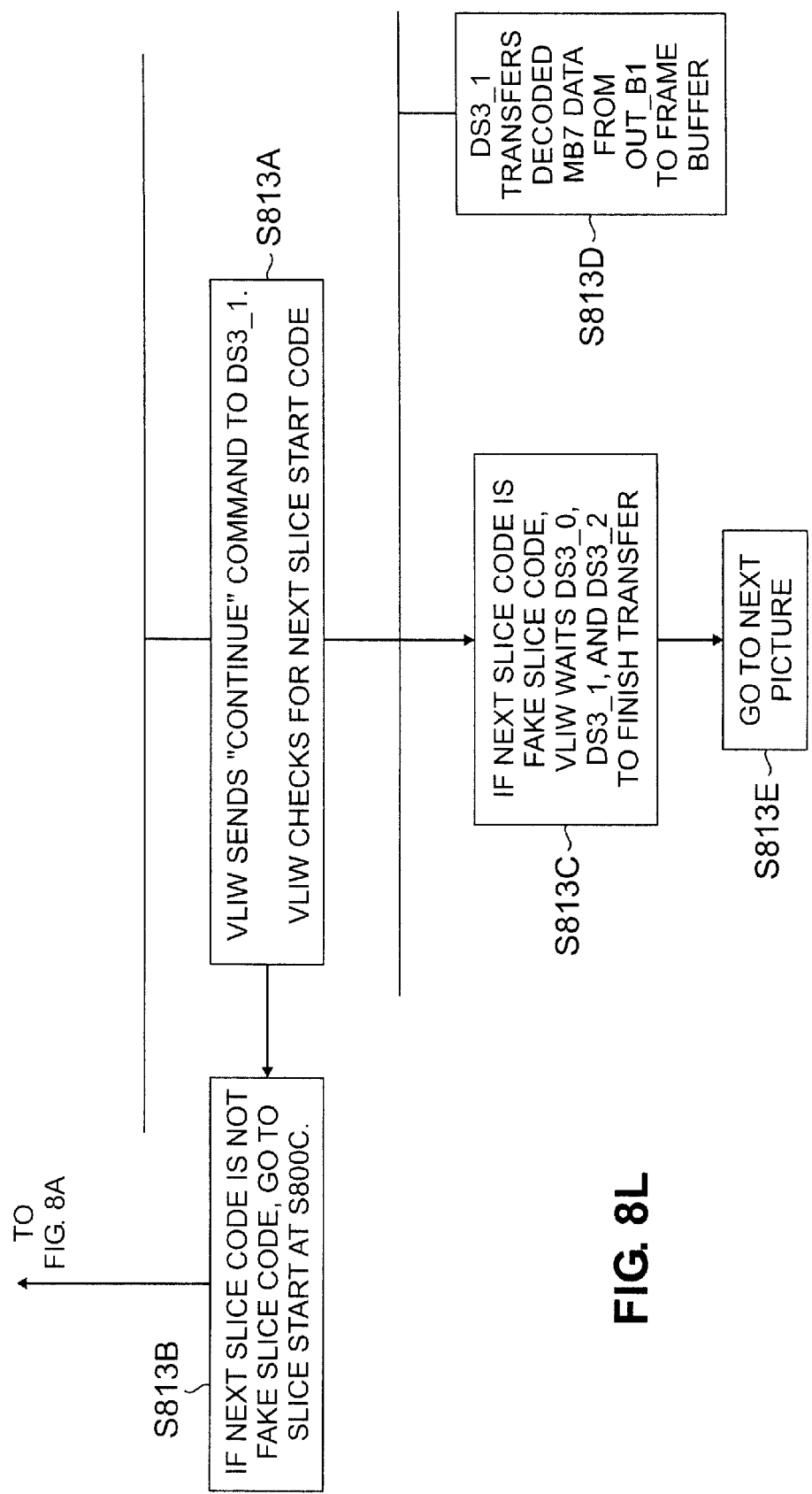

It is noteworthy that process steps S808A, S808D and S808C occur simultaneously. Also steps S808A and S808C–S808H occur simultaneously.
FIG. 8H In step S809A, DS3_2 39 continues to transfer decoded MB2 pixels from data cache 22 output buffer, Out_B2'.

In step S809B, VLIW 21 waits for DS1 31 data transfer in step S808G, and also sends a "GO" command to VLD 24 to proceed with the next macroblock. VLIW 21 also waits for DS2 38 transfer in step S808E, and sends a "continue" command to DS2 38 to transfer reference data for MB5. VLIW 21 also waits for DS 3_0 to output data to frame buffer 40 in step S 807A and sends a "continue" command to DS3_0 39 to transfer MB3 decoded pixel data from data cache 22 memory buffer, Out_B0' to frame buffer 40.

In step S809C, VLD waits for DS1 31 transfer in step S808G, and for a "GO" command from VLIW 21 to proceed with the next macroblock. VLD 24 also sends a "continue" command to DS1 31 to transfer data from CM1 29 memory buffer B1, after step S808G.

In step S809D, VLIW 21 reconstructs motion vector for MB6 from data stored in data cache 22 memory buffer, MB_B0', and set's up descriptors for DS2 38 to transfer reference data for MB6. VLIW 21 performs motion compensation and IDCTs for MB4 based upon reference data stored in MC_B0' and decoded DCT coefficients stored in data cache 22 memory buffer, MB_B2' respectively. Thereafter, VLIW 21 adds the IDCTs and motion compensation data, and saves the data in data cache 22 output memory buffer, Out_B1'.

In step S809E, DS2 38 transfers reference data for MB5 from frame buffer 40 to data cache 22 memory buffer, MC_B1'.

In step S809F, DS3_0 39 starts transfer of decoded pixels for MB3 to frame buffer 40.

In step S809G, DS1 31 transfers decoded header for MB 6 and DCT coefficients for MB6 from CM1 29 memory buffer B1 to data cache 22 memory buffer MB_B1'.

In step S809H, VLD 24 decodes DCT coefficients for MB7, and stores the decoded DCT coefficients and a dummy header in CM1 29 memory buffer B1. VLD 24 performs this operation if macroblock MB7 is the last macroblock in the slice. The dummy header may have a flag that indicates the end of a slice. Thereafter, VLD 24 finds a particular start code based upon start code sent by VLIW 21.

It is noteworthy that process steps S809A–S809C occur simultaneously. Also process steps S809D–S809H occur simultaneously.

FIG. 8I

In step S810A, DS3_0 39 continues to transfer decoded MB3 pixels from output buffer Out_B0'.

In step S810B, VLIW 21 waits for DS1 31 data transfer in step 809G, and also sends a "GO" command to VLD 24. VLIW 21 also waits for DS2 38 transfer in step S809E, and sends a "continue" command to DS2 38 to transfer reference data for MB6. VLIW 21 also waits for DS 3_2 to output data to frame buffer 40 in step S 809A, and sends a "continue" command to DS3_1 39 to transfer MB4 decoded pixel data from data cache 22 memory buffer Out_B1' to frame buffer 40.

In step S810C, VLD waits for DS1 31 transfer in step S809G, and for a "GO" command from VLIW 21 to proceed with the next macroblock. VLD 24 also sends a "continue" command to DS1 31 to transfer data from CM1 29 memory buffer B0, after step S809G.

In step S810D, VLIW 21 reconstructs motion vector for MB7 from data stored in data cache 22 memory MB_B1', and set's up descriptors for DS2 38 to transfer reference data for MB7. VLIW 21 also performs motion compensation and IDCTs for MB5 based upon reference data stored in MC_B1' and decoded DCT coefficients stored in data cache 22 memory buffer, MB_B0' respectively. Thereafter, VLIW 21 adds the IDCTs and motion compensation data, and saves the added data in data cache 22 output memory buffer, Out_B2'.

In step S810E, DS2 38 transfers reference data for MB6 from frame buffer 40 to data cache 22 memory buffer, MC_B0'.

In step S810F, DS3_1 39 starts transfer of decoded pixels for MB4 to frame buffer 40.

In step S810G, DS1 31 transfers a dummy header and DCT coefficients for MB7 from CM1 29 memory buffer B0 to data cache 22 memory buffer. MB_B2'.

It is noteworthy that process steps S810A–S810C occur simultaneously. Also process steps S810A and S810D–S810G occur simultaneously.

FIG. 8J

In step S811A, DS3_1 39 continues to transfer decoded MB4 pixels from output buffer, Out_B1'.

In step S811B, VLIW 21 waits for DS1 31 data transfer in step 810G, and also sends a "GO" command to VLD 24 to proceed with the slice or picture. VLIW 21 also waits for DS2 38 transfer in step S810E, and sends a "continue" command to DS2 38 to transfer reference data for MB7. VLIW 21 also waits for DS 3_0 to output data to frame buffer 40 in step S 810A, and sends a "continue" command to DS3_2 39 to transfer MB5 decoded pixel data from data cache 22 memory buffer Out_B2' to frame buffer 40.

In step S811C, VLIW 21 recognizes MB7 as the last macroblock. VLIW 21 performs motion compensation and IDCTs for MB6 based upon reference data stored in MC_B0' and decoded DCT coefficients stored in data cache 22 memory buffer, MB_B1' respectively. Thereafter, VLIW 21 adds the IDCTs and motion compensation data, and saves the data in data cache 22 output memory buffer, Out_B0'.

In step S811D, DS2 38 transfers reference data for MB7 from frame buffer 40 to data cache 22 memory buffer, MC_B1'.

In step S810E, DS3_2 39 starts transfer of decoded pixels for MB5 to frame buffer 40.

It is noteworthy that process steps S811A and S811B, as well as Steps S811C–S811E occur simultaneously.

FIG. 8K

In step S812A, DS3_2 39 continues to transfer decoded MB5 pixels from output buffer, Out_B2' to frame buffer 40.

In step S812B, VLIW 21 waits for DS2 38 transfer data in step S811C. VLIW 21 also waits for DS 3_1 to output data to frame buffer 40 in step S 811A, and sends a "continue" command to DS3_0 39 to transfer MB6 decoded pixel data from data cache 22 memory buffer, Out_B0' to frame buffer 40.

In step S812C, VLIW 21 performs motion compensation and IDCTs for MB7 based upon reference data stored in MC_B1' and decoded DCT coefficients stored in data cache 22 memory buffer, MB_B2' respectively. Thereafter, VLIW 21 adds the IDCTs and motion compensation data, and saves the added data in data cache 22 output memory buffer, Out_B1'.

In step S812D, DS3_0 39 starts transfer of decoded pixels for MB6 to frame buffer 40.

It is noteworthy that process steps S812A and S812B as well as Steps S812A and S812C–S811D occur simultaneously.

FIG. 8L

In step S813A, VLIW 21 sends a continue command to DS3_1 39, to transfer data for MB7. VLIW 21 also checks for start code for the next slice/picture. If the start code is not fake then in step S813B, the process moves back to step S801A in FIG. 8A.

In step S813C, if the next slice code is fake slice code, then VLIW waits for DS3_0, DS3_1 and DS3_2 39 transfers to finish.

In step S813D, DS3_1 transfers decoded data of MB7 to frame buffer from data cache output buffer, OUT_B1'.

In step S813E, the process goes to the next picture and process steps in FIGS. 8A–8L are repeated for the next picture.

The process steps of FIG. 8 illustrate a timing loop that synchronizes data decoding, data storage and data transfer by VLD 24, VLIW 21 and various DMA channels, e.g. DS1 31, DS2 38 and DS3 39. FIG. 8. process steps illustrate simultaneous data transfer of decoded MPEG video for three macroblocks MB0, MB1 and MB2 based upon the three paths in DS3 39 namely DS3-0, DS3-1 and DS3_2. This is merely to illustrate one aspect of the invention, other DMA transfers units with more than or less than three channels may be used to transfer raw video data.

The present invention has numerous advantages over the existing art. According to one aspect of the present invention, the decoding of an entire picture with a macroblock data including the header for a current macroblock and DCT coefficients of a previous macroblock assists in maintaining continues pipelined operation.

The foregoing aspects of the invention simplify the decoding and reconstruction process because VLD 24 decodes a macroblock header for a current macroblock MB(i) and stores the decoded header data with a macroblock already decoded (MB(i–1), and transfers the decoded header and macroblock data (DCTs) to data cache 22 for access by VLIW 21. This enables VLIW 21 to acquire reference data for a macroblock prior to performing motion compensation and IDCTs, e.g., when VLD 24 sends macroblock DCTs for MB2 and header for MB3, then VLIW 21 can acquire reference data for MB3 prior to performing motion compensation and IDCTs. This reduces idle time and improves decoding efficiency.

Furthermore, while data transfers occur via the various DMA channels, VLIW 21 and VLD 24 simultaneously perform various operations as discussed. This also improves the overall efficiency of the process.

The present invention has been described in general terms to allow those skilled in the art to understand and utilize the invention in relation to specific preferred embodiments. It will be understood by those skilled in the art that the present invention is not limited to the disclosed preferred embodiments, and may be modified in a number of ways without departing from the spirit and substance of the invention as described and claimed herein. For example VLIW 21 processor of the present invention is believed to be the most convenient processor architecture for use with the variable length decoder to achieve maximum parallelism and improve efficiency in MPEG decoding. However, other processors of the RISC or CISC type architecture may be optimized to be used as the VLIW discussed in this application.

The foregoing aspects of present invention are not limited to MPEG-1 or MPEG-2 decoding, MPEG-4 can also be decoded by the foregoing process steps. Furthermore, the foregoing aspects of the present invention are not limited to MPEG. The foregoing aspects of the present invention are applicable wherever there is a need for efficient synchronization data exchange between a processor and a co-processor, or between portions of a processor for purposes of maintaining coherence, accuracy and parallelism.

In addition, currently the core processor 20 and co-processor 23a are on the same integrated circuit chip. However, the foregoing aspects of the present invention will be applicable to other integrated circuits even if both the core processor and co-processor are not on the same chip.

Furthermore, the present invention can be implemented essentially in software. This is possible because software can dynamically create and maintain virtual buffering, implement variable length decoding as well as discrete cosine transforms, and the like. Hence, the foregoing aspects of the present invention can be implemented essentially in software running on a general-purpose programmable microprocessor/computer and still retain the spirit and substance of the present invention, as more fully expressed in the attached claims.

We claim:

1. A MPEG video decoding system having a very long instruction word (VLIW) processor in a core processor with a data cache, a data stream decoder having a memory buffer and an output storage device, wherein the decoder and output storage device are each connected to the core processor by respective data transfer units, and the MPEG video decoding system includes microprocessor executable process steps, comprising:

a first block of the process steps for controlling the operation of the VLIW having included therein all data transfer waits and all data transfer continues, wherein all execution operations of the executable process steps are contained in a single trace, wherein the VLIW operations trace includes motion vector reconstruction commands for a first macroblock, motion compensation and inverse transformation commands for a third macroblock occurring continually without any waits or data transfer channel operation during the process step execution.

2. The system of claim 1, wherein each of the VLIW execution operations including data transfers from the decoder memory buffer to the core processor, motion compensation transfers from the output storage device to the core processor and output transfers from the core processor to the output storage device occur continually.

3. The system of claim 1, wherein the core processor directs the completion of inverse transforms and motion compensation upon a same macroblock within a single trace, and buffers results of the transformations and motion compensation.

4. A method for reconstructing raw video signal data from decoded MPEG video data in a MPEG video decoding system having a very long instruction word (VLIW) processor in a core processor, a data stream decoder as a co-processor with a memory buffer, and an output storage device, wherein the co-processor and the output storage device are each connected to the core processor by respective data transfer, comprising the steps of:

programming the VLIW processor operations to include all data transfer waits, all data transfer continues and all semaphore waits with no data transfer pending continues associated with transfer between the core processor and either of the data stream decoder and the output storage device; and performing all execution operations of the program within a single trace, wherein the VLIW execution trace includes motion vector reconstruction commands for a first macroblock, motion compensation and inverse transformation commands for a third macroblock occurring continually without any waits or data transfer channel operation during the execution processes.

5. The method of claim 4, further comprising the step of:

overlapping each of the very long instruction word execution operations including co-processor data transfers to the core processor, motion compensation transfers from the output storage device to the core processor and output transfers from the core processor to the output storage device to occur continually without data transfer waits.

6. The method of claim 4, further comprising:

directing the core processor to complete the inverse transforms and motion compensation upon a same macroblock within a single trace, and buffer results of the transformations and compensation.

* * * * *

UNITED STATES PATENT AND TRADEMARK OFFICE
CERTIFICATE OF CORRECTION

PATENT NO. : 6,574,273 B1
DATED : June 3, 2003
INVENTOR(S) : Amelia Carino Luna et al.

It is certified that error appears in the above-identified patent and that said Letters Patent is hereby corrected as shown below:

Column 4,
Line 56, after "maintaining", change "continues" to -- continuous --.

Column 5,
Line 47, after "according" insert -- to --.

Column 6,
Line 43, change "MB_Bi'" to -- MB_B1' --.
Line 61, after "FIG. 3 is" insert -- a --.

Column 7,
Lines 53-54, change "macroblock" to -- macroblocks --.

Column 8,
Line 6, change "VLD 24 receive" to -- VLD 24 receives --.
Line 30, change "verities" to -- verifies --.
Line 53, change "S61 1" to -- S611--.

Column 9,
Line 37, after "using", change "set" to -- sets --.
Line 47, after "other", change "set" to -- sets --.

Column 10,
Line 33, change last word "continues" to -- continuous --.

Column 11,
Line 11, change "set's up" to -- sets up --.
Lines 17 and 46, change "MB-B1'" to -- MB_B1' --.
Line 37, change "MC-B0" to -- MC_B0 --.

Column 12,
Line 12, change "set's up" to -- sets up --.
Line 16, change "MB-B1'" to -- MB_B1' --.
Line 34, change ""GO" to -- "GO" --.
Line 48, change "MB-B0'" to -- MB_B0' --.

UNITED STATES PATENT AND TRADEMARK OFFICE
CERTIFICATE OF CORRECTION

PATENT NO. : 6,574,273 B1
DATED : June 3, 2003
INVENTOR(S) : Amelia Carino Luna et al.

It is certified that error appears in the above-identified patent and that said Letters Patent is hereby corrected as shown below:

Column 13,
Line 2, after "well" insert -- as --.
Line 18, change last word "is" to -- in --.
Line 41, change "Out-B1'" to -- Out_B1' --.
Line 55, after "continues" change "to" to -- the --.
Line 62, change "DS 3_0" to -- DS3_0 --.

Column 14,
Lines 6 and 52, change "set's up" to -- sets up --.
Line 30, change "S808D" to -- S808B --.
Line 32, change "S808C" to -- S808D --.
Line 41, change "DS 3_0" to -- DS3_0 --.

Column 15,
Line 18, change "DS 3_2" to -- DS3_2 --.
Line 19, change "S 809A" to -- S809A --.
Line 30, change "set's up" to -- sets up --.
Line 57, change "DS 3_0" to -- DS3_0 --.
Line 58, change "S 810A" to -- S810A --.

Column 16,
Line 12, change "DS 3_1" to -- DS3_1 --.
Line 13, change "S 811A" to -- S811A --.
Line 27, change "S812C-S811D" to -- S812C-S812D --.
Line 49, after "namely", change "DS3-0, DS3-1" to -- DS 3_0, DS3_1 --.
Line 51, change first word "transfers" to -- transfer --.
Line 58, change "continues" to -- continuous --.
Line 63, change "(MB(i-1)" to -- (MB(i-1)) --.

UNITED STATES PATENT AND TRADEMARK OFFICE
CERTIFICATE OF CORRECTION

PATENT NO.    : 6,574,273 B1
DATED         : June 3, 2003
INVENTOR(S)   : Amelia Carino Luna et al.

It is certified that error appears in the above-identified patent and that said Letters Patent is hereby corrected as shown below:

Column 17,
Line 24, after "of" insert -- the --.

Signed and Sealed this

Sixth Day of December, 2005

JON W. DUDAS
*Director of the United States Patent and Trademark Office*